United States Patent
Yoshikawa et al.

(10) Patent No.: US 10,957,067 B2
(45) Date of Patent: Mar. 23, 2021

(54) CONTROL APPARATUS, OBJECT DETECTION SYSTEM, OBJECT DETECTION METHOD AND PROGRAM

(71) Applicant: TOYOTA JIDOSHA KABUSHIKI KAISHA, Toyota (JP)

(72) Inventors: Kei Yoshikawa, Nagoya (JP); Shintaro Yoshizawa, Nagoya (JP); Yuto Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 16/358,988

(22) Filed: Mar. 20, 2019

(65) Prior Publication Data

US 2019/0318498 A1    Oct. 17, 2019

(30) Foreign Application Priority Data

Apr. 17, 2018   (JP) .............................. JP2018-079235

(51) Int. Cl.
G06T 7/70 (2017.01)
G06T 7/80 (2017.01)

(52) U.S. Cl.
CPC ............... *G06T 7/70* (2017.01); *G06T 7/80* (2017.01); *G06T 2207/10028* (2013.01)

(58) Field of Classification Search
CPC .... G06T 7/70; G06T 7/80; G06T 2207/10028
See application file for complete search history.

(56) References Cited

U.S. PATENT DOCUMENTS

| 2013/0114861 | A1  | 5/2013 | Takizawa |
|---|---|---|---|
| 2013/0176305 | A1  | 7/2013 | Ito et al. |
| 2016/0165215 | A1* | 6/2016 | Gu .................. H04N 13/243 348/43 |
| 2017/0262247 | A1* | 9/2017 | Yoganandan ......... G06F 3/0482 |
| 2018/0052839 | A1* | 2/2018 | Sharma .................. G06F 16/29 |
| 2018/0234612 | A1* | 8/2018 | Kunkel .................... G06T 7/70 |

FOREIGN PATENT DOCUMENTS

| JP | 2013-101045 | 5/2013 |
|---|---|---|
| JP | 5465128 | 4/2014 |
| JP | 2015-190818 | 11/2015 |
| JP | 2016-099257 | 5/2016 |

* cited by examiner

*Primary Examiner* — David F Dunphy
(74) *Attorney, Agent, or Firm* — Oblon, McClelland, Maier & Neustadt, L.L.P.

(57) ABSTRACT

A control apparatus capable of efficiently detecting a target object even when the target object is shielded by other objects is provided. An object recognition unit 114 recognizes a target object 80 present in a 3D environment 4 by using measurement data acquired from a sensor 12. An information generation unit 116 generates 3D environmental information by integrating a plurality of measurement data. A position determination unit 120 determines an optimal position of the sensor 12 for performing the next measurement. A sensor control unit 140 moves the sensor 12 to the determined optimal position. The position determination unit 120 determines, by using the 3D environmental information, a position of the sensor 12 where the sensor 12 can take an image in which a size of an area shielded by at least one first object is larger as the optimal position.

8 Claims, 26 Drawing Sheets

CONTROL APPARATUS, OBJECT DETECTION SYSTEM, OBJECT DETECTION METHOD AND PROGRAM

CROSS REFERENCE TO RELATED APPLICATIONS

This application is based upon and claims the benefit of priority from Japanese patent application No. 2018-079235, filed on Apr. 17, 2018, the disclosure of which is incorporated herein in its entirety by reference.

BACKGROUND

The present disclosure relates to a control apparatus, an object detection system, an object detection method and a program. In particular, the present disclosure relates to a control apparatus, an object detection system, an object detection method and a program for detecting an object by controlling a sensor.

There is a technique for detecting a target object, which is an object to be detected, by operating a sensor such as a range sensor. In such techniques, it is necessary to consider that the target object may be shielded by other objects (obstacles). In relation to this technique, Japanese Unexamined Patent Application Publication No. 2015-190818 discloses a work support system for improving efficiency of work for completion of the whole work. The work support system disclosed in Japanese Unexamined Patent Application Publication No. 2015-190818 includes a measurement apparatus that measures (i.e., obtains) three-dimensional (3D) shape data of an object to be measured, a transfer apparatus that moves at least one of the objects to be measured and the measurement apparatus and thereby changes a measurement position where the measurement apparatus measures the object to be measured, and a work support apparatus that controls the transfer apparatus. A candidate position setting unit sets, on a surface of the object to be measured, candidate measurement positions for the entire area of a measurement target range designated as a measurement target range. An available surface calculation unit calculates, for each of the set measurement positions, the number of measurable surfaces of the object to be measured or an area (i.e., a size) of the measurable surfaces. A ranking determination unit determines, for each measurement direction, a priority order of measurement according to the calculated number or the area (i.e., the size) of the surfaces. A measurement control unit instructs the transfer apparatus to perform measurement in each measurement direction according to the determined priority order.

SUMMARY

The present inventors have found the following problem. Depending on an operating environment of a sensor, a plurality of target objects, which are objects to be detected, may exist in the operating environment. Further, objects other than the target object(s) may exist in the operating environment. In such cases, there is a possibility that the target object may be shielded by other objects. Therefore, there is a possibility that even if the sensor is moved at random without taking the positional relation between the target object and the other object(s) into consideration, it may take an enormous amount of time to detect the target object. That is, there is a possibility that even if the sensor is moved to a certain position and performs measurement at that position, the target object may not be measured because the area shielded by the other object(s) is large. Therefore, there is a possibility that the time that is taken to move the sensor to that position and perform the measurement may be wasted. In the technique disclosed in Japanese Unexamined Patent Application Publication No. 2015-190818, objects other than the object to be measured are not taken into consideration. Therefore, in the technique disclosed in Japanese Unexamined Patent Application Publication No. 2015-190818, there is a possibility that when the object to be measured is shielded by an obstacle, the object to be measured cannot be efficiently detected.

The present disclosure provides a control apparatus, an object detection system, an object detection method and a program capable of efficiently detecting a target object even when the target object is shielded by other objects.

A first exemplary aspect is a control apparatus configured to detect a target object to be detected by controlling a sensor configured to measure surroundings in a three-dimensional (3D) environment, including: an object recognition unit configured to recognize the target object present in the 3D environment by using measurement data acquired from the sensor; an information generation unit configured to generate 3D environmental information indicating each point on an object present in the 3D environment by integrating a plurality of measurement data; a position determination unit configured to determine an optimal position of the sensor for performing next measurement; and a sensor control unit configured to move the sensor to the determined optimal position, in which the position determination unit determines, by using the 3D environmental information, a position of the sensor where the sensor can take an image in which a size of an area shielded by at least one first object is larger as the optimal position, the at least one first object being the target object recognized by the object recognition unit.

Further, another exemplary aspect is an object detection system including: a sensor configured to measure surroundings in a 3D environment; and a control apparatus configured to detect a target object to be detected by controlling the sensor, in which the control apparatus includes: an object recognition unit configured to recognize the target object present in the 3D environment by using measurement data acquired from the sensor; an information generation unit configured to generate 3D environmental information indicating each point on an object present in the 3D environment by integrating a plurality of measurement data; a position determination unit configured to determine an optimal position of the sensor for performing next measurement; and a sensor control unit configured to move the sensor to the determined optimal position, and in which the position determination unit determines, by using the 3D environmental information, a position of the sensor where the sensor can take an image in which a size of an area shielded by at least one first object is larger as the optimal position, the at least one first object being the target object recognized by the object recognition unit.

Further, another exemplary aspect is an object detection method for detecting a target object to be detected by controlling a sensor configured to measure surroundings in a 3D environment, including: recognizing the target object present in the 3D environment by using measurement data acquired from the sensor; generating 3D environmental information indicating each point on an object present in the 3D environment by integrating a plurality of measurement data; determining, by using the 3D environmental information, a position of the sensor where the sensor can take an image in which a size of an area shielded by at least one first object is larger as an optimal position of the sensor for performing next measurement, the at least one first object being the recognized target object; and moving the sensor to the determined optimal position.

Further, another exemplary aspect is a program for performing an object detection method in which a target object to be detected is detect by controlling a sensor configured to measure surroundings in a 3D environment, the program being adapted to cause a computer to perform: recognizing the target object present in the 3D environment by using measurement data acquired from the sensor; generating 3D environmental information indicating each point on an object present in the 3D environment by integrating a plurality of measurement data; determining, by using the 3D environmental information, a position of the sensor where the sensor can take an image in which a size of an area shielded by at least one first object is larger as an optimal position of the sensor for performing next measurement, the at least one first object being the recognized target object; and moving the sensor to the determined optimal position.

In the present disclosure, when a target object is detected by using the sensor, the sensor can be moved to a position where the sensor can measure an area that has become a blind sport (i.e., that cannot be viewed) due to the first object more appropriately. Therefore, it is possible to reduce the number of movements of the sensor and the time required therefor when the target object is detected by using the sensor. Consequently, according to the present disclosure, it is possible to efficiently detect a target object even when the target object is shielded by other objects.

Further, the position determination unit preferably calculates, as a candidate for the optimal position, a position of the sensor where the sensor can measure a placement available area according to a position and a shape of a storage object in which the target object can be placed, and selects the optimal position from the candidate, the placement available area being an area where the target object can be placed.

By calculating viewpoint candidates as described above, it is possible to exclude, from the optimal position, a viewpoint position that cannot contribute to the detection of the target object depending on the position and the shape of the storage object. Therefore, the present disclosure makes it possible to efficiently detect a target object.

Further, the position determination unit preferably determines whether or not, among candidate positions, there is an unmeasured position from which the sensor can measure the area shielded by the first object but has not performed measurement yet, and when it is determined that there is the unmeasured position, performs a process for determining the optimal position.

The state where there is no unmeasured position means a state where the target object probably cannot be detected even when measurement is further performed. Therefore, by determining whether or not there is an unmeasured position as in the case of the present disclosure, it is possible to terminate the process for determining the optimal position when there is no unmeasured position. Therefore, the present disclosure can finish the process for detecting the target object without performing a wasteful process.

Further, the control apparatus preferably further includes a removal determination unit configured to, when it is determined that there is no unmeasured position, determine the first object to be removed so that the area shielded by the first object can be measured.

By being configured as described above, the present disclosure can make it possible to measure an unmeasured area, which has not been able to be measured, by removing the first object to be removed in the subsequent process, and thereby efficiently detect the unmeasured area.

Further, the control apparatus preferably further includes an arm control unit configured to control an arm so that the determined first object is removed.

By being configured as described above, the present disclosure can make it possible to automatically remove the first object to be removed. Therefore, it is possible to efficiently measure the unmeasured area.

Further, the position determination unit preferably determines whether or not a search of the placement available area, which is the area where the target object can be placed, has been completed by using the 3D environmental information, and when it is determined that the search has not been completed, performs a process for determining the optimal position.

By being configured as described above, the present disclosure can prevent, when it is determined that the search of the storage object has been completed, the process for determining the optimal position from being performed. Therefore, the present disclosure can prevent an unnecessary process from being performed. Therefore, the present disclosure can prevent or reduce an increase in the time taken to detect an object.

According to the present disclosure, it is possible to provide a control apparatus, an object detection system, an object detection method and a program capable of efficiently detecting a target object even when the target object is shielded by other objects.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Embodiments according to the present disclosure are described hereinafter with reference to the drawings. Note that the same symbols are assigned to substantially the same components.

Figure 1:
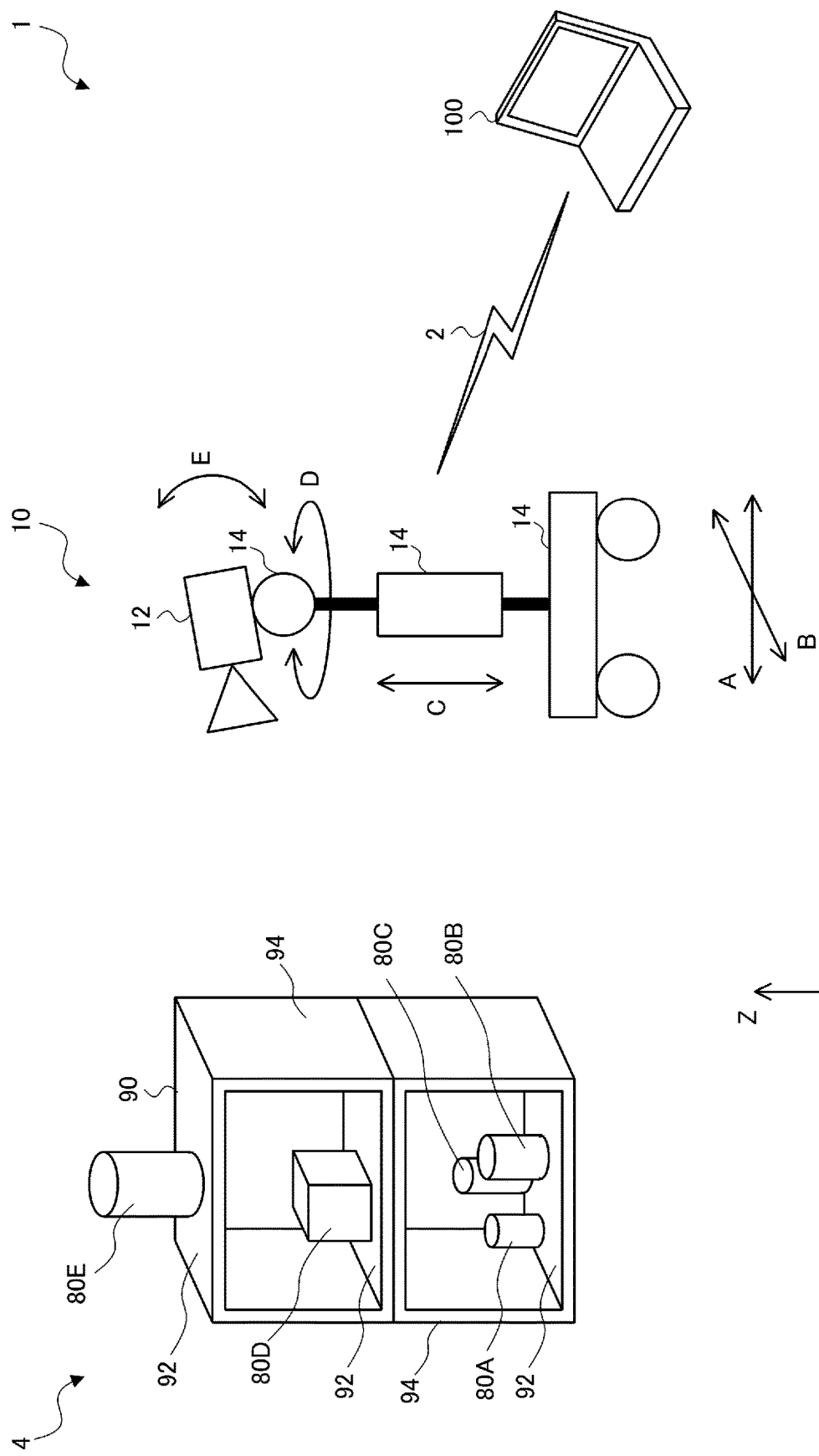
FIG. 1 shows an object detection system according to a first embodiment.
Figure 2:
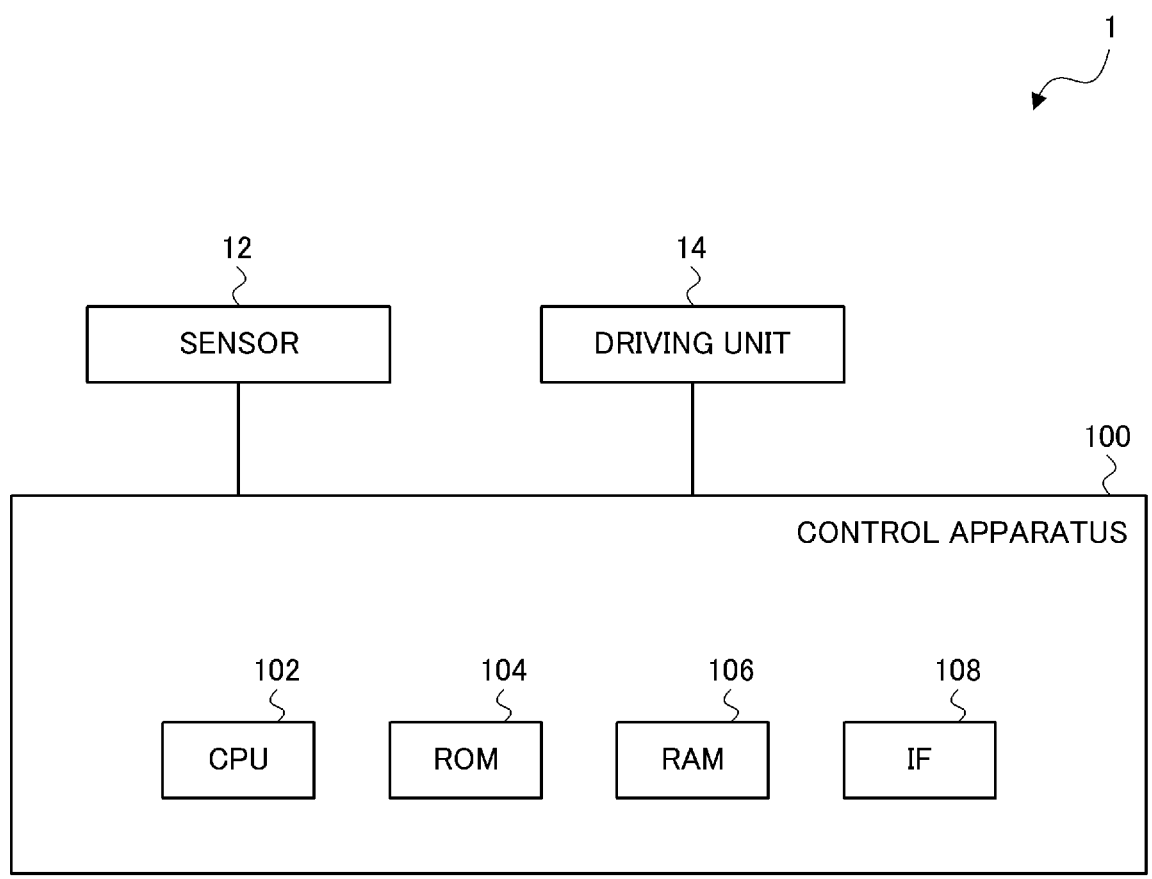
FIG. 2 is a block diagram showing a hardware configuration of the object detection system according to the first embodiment.

FIG. 1 shows an object detection system 1 according to a first embodiment. Further, FIG. 2 is a block diagram showing a hardware configuration of the object detection system 1 according to the first embodiment. The object detection system 1 according to the first embodiment includes an object detection apparatus 10 and a control apparatus 100. The object detection apparatus 10 includes a sensor 12 and a driving unit 14 that drives the sensor 12.

The control apparatus 100 is, for example, a computer. The control apparatus 100 is connected to the object detection apparatus 10 through a wired or wireless communication link 2 so that they can communicate with each other. Therefore, the control apparatus 100 is connected to the sensor 12 and the driving unit 14 so that they can communicate with each other.

Note that in FIG. 1, the control apparatus 100 and the object detection apparatus 10 are shown as physically separate apparatuses. However, the control apparatus 100 may be incorporated into the object detection apparatus 10. Further, at least one component of the control apparatus 100 (which will be described later) may be incorporated into the object detection apparatus 10. In such a case, the object detection apparatus 10 also has functions as a computer.

The object detection apparatus 10 moves in a three-dimensional (3D) environment 4. The object detection apparatus 10 can autonomously move in the 3D environment 4. Note that the 3D environment 4 may be expressed by an orthogonal coordinate system or may be expressed by a polar coordinate system. In the following descriptions, an example in which the 3D environment 4 is expressed by an (X, Y, Z)-orthogonal coordinate system is shown.

The sensor 12 is a 3D sensor capable of measuring a distance to an object, such as a depth sensor, a range sensor (or a distance censor), or a 3D camera (a stereo camera). The sensor 12 is, for example, a lidar (LIDAR: Light Detection and Ranging) or the like. The object detection apparatus 10 (the sensor 12) has five degrees of freedom by the driving unit 14 as described below.

As indicated by an arrow A, the driving unit 14 moves the object detection apparatus 10 (the sensor 12) in an X-axis direction of the 3D environment 4. Further, as indicated by an arrow B, the driving unit 14 moves the object detection apparatus 10 (the sensor 12) in a Y-axis direction of the 3D environment 4. Further, as indicted by an arrow C, the driving unit 14 moves the sensor 12 in a Z-axis direction of the 3D environment 4 (i.e., in a vertical direction). Further, as indicted by an arrow D, the driving unit 14 rotates (turns) the sensor 12 in parallel to an XY-plane of the 3D environment 4 (i.e., in a horizontal direction). Further, as indicted by an arrow E, the driving unit 14 rotates (swings) the sensor 12 in an up/down direction of the 3D environment 4. That is, as indicated by the arrows A, B and C, the sensor 12 is moved by the driving unit 14 so that its 3D position coordinates in the 3D environment 4 changes. Further, as indicated by the arrows D and E, the sensor 12 is moved by the driving unit 14 so that its posture (its orientation) in the 3D environment 4 changes. In the following descriptions, the "movement" of the sensor 12 includes a change in the 3D position coordinates and a change in the posture. Further, the "position" of the sensor 12 includes its 3D position coordinates and its posture.

The sensor 12 measures surroundings of the object detection apparatus 10. The sensor 12 acquires an image(s) of an object(s) present in the measured surroundings. Further, the sensor 12 measures a distance to each point on the object observed from the sensor 12 (the object detection apparatus 10). Then, the sensor 12 generates distance data indicating the measured distance. That is, the distance data corresponds to the measurement data generated by the sensor 12. The sensor 12 generates distance image data indicating a distance image (a point cloud) as the distance data. That is, the distance data represents a group of points (hereinafter also referred to as a point group) on the surface of each object present around the sensor 12 (the object detection apparatus 10) in three dimensions. The sensor 12 scans its surroundings with laser light (i.e., emits laser light to its surroundings), receives reflected light reflected on an object, and calculates a distance to the object from, for example, a difference between a transmission time of the laser light and a reception time of the reflected light. Then, the object detection apparatus 10 (the sensor 12) calculates 3D coordinates (X, Y, Z) of a point at which the laser light is reflected based on 3D position coordinates of the sensor 12 in the 3D environment 4, an emitting direction of the laser light, and the distance to the object. In this way, the object detection apparatus 10 (the sensor 12) measures a position of each object in the 3D environment 4. Note that, in the following descriptions, the term "image" also means "image data representing an image" as data to be processed in information processing.

A plurality of target objects 80, which are objects to be detected by the object detection apparatus 10, are disposed in the 3D environment 4. Further, at least one storage object 90 is provided in the 3D environment 4. The storage object 90 includes at least one shelf board 92 and a wall surface(s) 94. The storage object 90 can house a plurality of target objects 80. In the example shown in FIG. 1, target objects 80A to 80E are disposed (i.e., placed) in the storage object 90.

The control apparatus 100 includes, as a main hardware configuration, a CPU (Central Processing Unit) 102, a ROM (Read Only Memory) 104, a RAM (Random Access Memory) 106, and an interface unit 108 (IF; Interface). The CPU 102, the ROM 104, the RAM 106, and the interface unit 108 are connected to each other through a data bus or the like.

The CPU 102 has functions as an arithmetic apparatus that performs control processes, arithmetic processes, etc. The ROM 104 has a function of storing a control program(s), an arithmetic program(s), etc. that are executed by the CPU 102. The RAM 106 has a function of temporarily storing processing data and the like. The interface unit 108 externally receives/outputs signals wirelessly or through a wire. Further, the interface unit 108 receives a data input operation performed by a user and displays information for the user.

Figure 3:
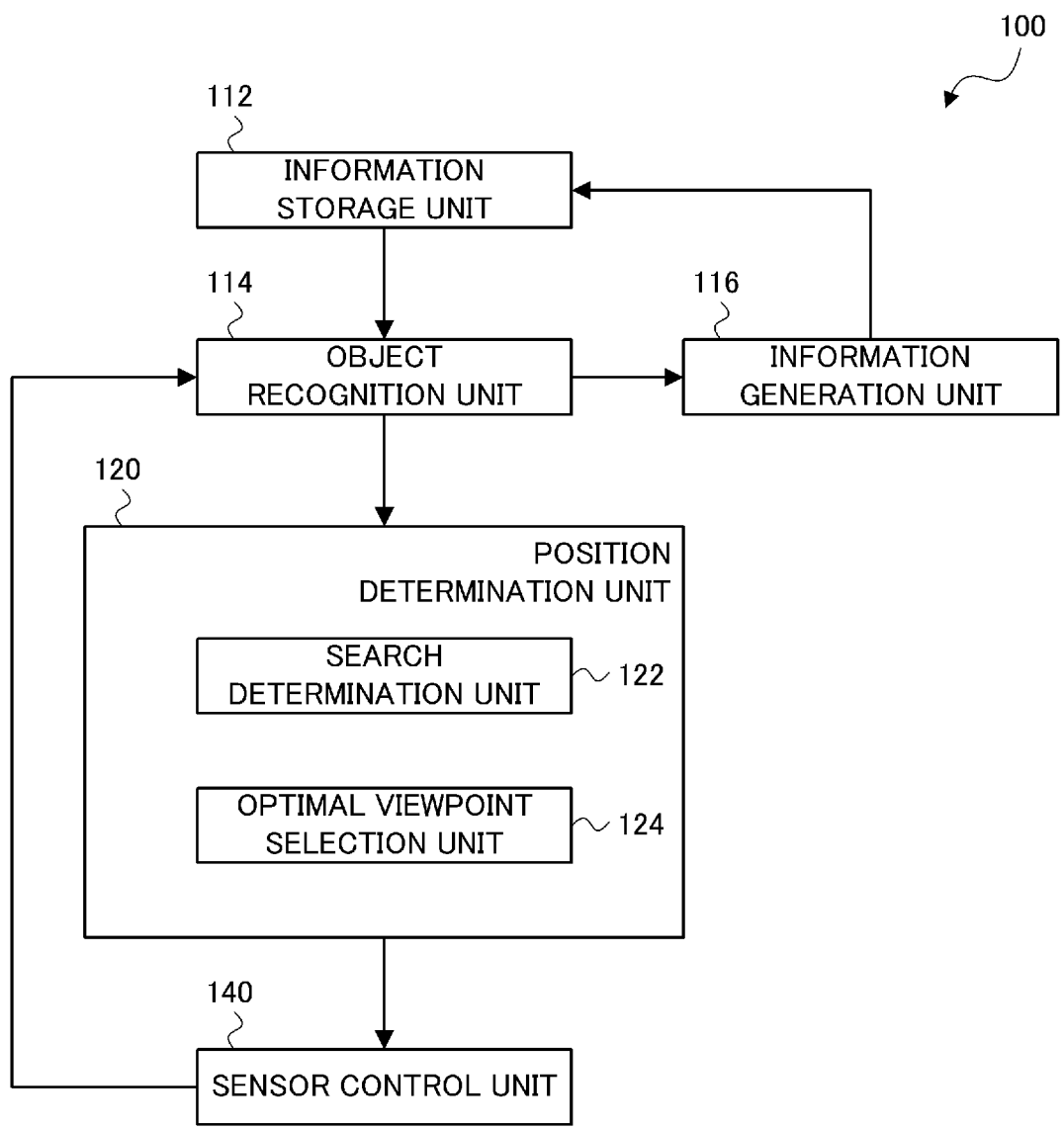
FIG. 3 is a functional block diagram showing a configuration of a control apparatus according to the first embodiment.

FIG. 3 is a functional block diagram showing a configuration of the control apparatus 100 according to the first embodiment. The control apparatus 100 includes an information storage unit 112, an object recognition unit 114, an information generation unit 116, a position determination unit 120, and a sensor control unit 140 (hereinafter, also referred to as "each component"). Further, the position determination unit 120 includes a search determination unit 122 and an optimal viewpoint selection unit 124. Each component can be implemented by, for example, having the CPU 102 execute a program(s) stored in the ROM 104. Further, necessary programs may be stored in an arbitrary nonvolatile recording medium in advance, and may be installed as required. Note that the implementation of each component is not limited to the above-described software implementation and may be implemented by hardware such as some type of circuit devices. Further, at least one of the aforementioned components may be implemented by physically-separate individual hardware. This also applies to a later-described second embodiment.

The information storage unit 112 stores 3D environmental information, storage object information, target object information, and sensor information. Further, the information storage unit 112 may store recognition results obtained by the object recognition unit 114 (which will be described later). The "3D environmental information" is information indicating 3D coordinate data of each point (of a point group) on each object present in the 3D environment 4. When there are a plurality of 3D environments 4, the information storage unit 112 may store a plurality of 3D environmental information pieces. For example, 3D environmental information may be generated and stored for each environment such as an environment of a house, an environment of a shop, an environment of a tenant (i.e., a rental room), and an environment of a floor.

The 3D environmental information indicates, for example, whether or not there is any object at a given point represented by 3D coordinates (X, Y, Z). Therefore, the control apparatus 100 and the object detection apparatus 10 can recognize a shape of an object by detecting presence of some object in consecutive 3D coordinates in the 3D environmental information. The 3D environmental information is acquired by, for example, having the sensor 12 scan the entire space of the 3D environment 4 and calculate 3D coordinates of each point on each object. That is, the 3D environmental information can be generated by using the sensor 12. Note that the 3D environmental information corresponds to information (or data) obtained by integrating (or combining) 3D measurement data (distance image data) generated by measurement performed by the sensor 12. That is, the 3D environmental information can be generated by integrating (or combining) 3D measurement data obtained by having the sensor 12 perform measurement from one viewpoint position with 3D measurement data obtained by having the sensor 12 perform measurement from another viewpoint position. In other words, the 3D environmental information is successively updated as 3D measurement data is successively generated at a plurality of viewpoint positions by the sensor 12.

The "storage object information" is information related to the storage object 90. The storage object information indicates a 3D shape and a size (dimensions) of the storage object 90. For example, the storage object information may be CAD (computer-aided design) data of the object. Further, the storage object information indicates a position (3D coordinates) in the 3D environment 4. Therefore, by integrating (or combining) the storage object information into the 3D environmental information, the control apparatus 100 can recognize where the storage object 90 is located in the 3D environment 4 by using the 3D environmental information. In other words, the control apparatus 100 can recognize which coordinates (X, Y, Z) in the 3D environment 4 the shelf board(s) 92 and the wall surface(s) 94 are located at by using the 3D environmental information. Further, the storage object information may also include information indicating an area (i.e., a size) of the shelf board 92, an edge(s) of the shelf board 92, an opening(s) in the shelf board 92, etc.

The "target object information" is information necessary to detect the target object to be detected by the object detection apparatus 10. Each target object 80 is registered in the object detection system 1 by storing its target object information in the information storage unit 112. The target object information may include identification information (e.g., a registered name) of the target object 80. Further, for example, the target object information indicates a shape and a size (dimensions) of the target object 80. For example, the target object information may be CAD data of the object. Note that the target object information may not include position information such as information indicating where the corresponding object is placed. Therefore, although the control apparatus 100 can recognize that some object is placed on the shelf board 92 by using the 3D environmental information, it cannot recognize which target object 80 corresponds to that object unless a later-described object recognition process is performed. The object detection system 1 makes a search as to where a registered target object 80 is located in the 3D environment 4 by using the target object information and the 3D environmental information. In other words, the object detection system 1 detects (i.e., determines) which area in the 3D environment 4 corresponds to the target object 80.

The "sensor information" is information related to measurement performed by the sensor 12. For example, the sensor information indicates an angle of view (a viewing angle; a field-of-view range), a focal length, a resolution, number of pixels, and the like of the sensor 12. That is, the sensor information may indicate a measurable range of the sensor 12. In this way, a size, a resolution, and the like of 3D image data (distance image data) generated by the sensor 12 can be specified.

When the 3D measurement data (the distance image) is generated by the measurement performed by the sensor 12, the object recognition unit 114 recognizes the target object 80 present in the 3D environment 4 by using the 3D measurement data and information stored in the information storage unit 112. Specifically, the object recognition unit 114 detects a registered target object 80 from the 3D measurement data (and, if necessary, the 3D environmental information). More specifically, the object recognition unit 114 calculates, for each object, a difference between information indicating the shape of that object in the 3D measurement data (the distance image) and object information (CAD data or the like) indicating the shape of the target object 80. Then, the object recognition unit 114 recognizes that an object for which the calculated difference is smaller than a predetermined threshold as the target object 80. Further, the object recognition unit 114 associates identification information of the detected target object 80 with position information indicating a position where that target object 80 is located.

The information generation unit 116 generates 3D environmental information. Specifically, when an object recognition process is performed by the object recognition unit 114, the information generation unit 116 updates the 3D environmental information by using a result of the object recognition process (a recognition result). Note that the 3D environmental information may include only position information corresponding to the storage object 90 at the initial stage. In other words, before the sensor 12 starts measurement, only the storage object 90 is present in a 3D virtual space represented by the 3D environmental information. Then, every time the sensor 12 performs measurement and an object is recognized by the object recognition unit 114, the information generation unit 116 integrates 3D measurement data generated by the measurement by the sensor 12 into the 3D environmental information. In this way, information on objects included in the 3D environmental information increases.

It should be noted that depending on the viewpoint of the sensor 12 or the position of the target object 80, a part of the target object 80 may be shielded by another target object 80 or the wall surface 94 or the like of the storage object 90 even though that target object 80 is present in the field of view (the angle of view) of the sensor 12. In such a case, the shielded part of the target object 80 is not photographed by the sensor 12. For example, a target object 80B is present in front of a target object 80C in FIG. 1. Therefore, there is a possibility that, from a certain viewpoint position, a part of the target object 80C (i.e., a lower-right part of the target object 80C shielded by the target object 80B) is not photographed by the sensor 12. In this case, the target object 80B acts as an obstacle and forms a blind spot for the sensor 12 when the sensor 12 measures (photographs) the target object 80C. Further, at least a part of the target object 80C is present in the blind spot.

In this case, there is a possibility that the object 80 may not be recognized by the object recognition unit 114 due to lack of the amount of information indicating its shape and the like. In such a case, the information generation unit 116 adds information indicating a shape of the part of the target object 80, which has not been recognized, photographed by the sensor 12 in the 3D environmental information. In this case, although the control apparatus 100 can recognize that some object exists in that position by using the 3D environmental information, it cannot recognize which target object 80 corresponds to that object. Therefore, the 3D environmental information may include information related to a recognized target object 80 and information related to a target object 80 that has not been recognized (hereinafter also referred to as unrecognized target object 80).

The position determining unit 120 determines an optimal viewpoint position (an optimal position) of the sensor 12 for the next measurement (later-described S130 etc. in FIG. 4). Specifically, the position determining unit 120 determines, as the optimal viewpoint position, a viewpoint position from which it is expected that the target object 80, which is possibly disposed in the storage object 90 but has not been recognized, can probably be recognized when the sensor 12 is moved to that viewpoint position and measures (photographs) the that target object 80 the next time. Here, the recognized target object 80 (e.g., the target object 80B in FIG. 1) is referred to as a first object and the target object 80 that has not been recognized because it is partially shielded by the first object (e.g., the target object 80C in FIG. 1) is referred to as a second object. In this case, the position determining unit 120 determines, as the optimal viewpoint position, a viewpoint position from which the sensor 12 can measure an area that is shielded by the first object and becomes a blind spot by using the 3D environmental information. That is, in order to enable an area shielded by at least one first object recognized by the object recognizing unit 114 to be measured by the sensor 12, the position determining unit 120 determines, as the optimal viewpoint position, a position of the sensor 12 where the sensor 12 will perform the next measurement according to the position of the first object by using the 3D environmental information. In other words, the position determination unit 120 determines, by using the 3D environmental information, a position of the sensor 12 where the sensor 12 can take a distance image in which a size of an area shielded by at least one first object recognized by the object recognition unit 114 is larger as the optimal viewpoint position. In this way, the control apparatus 100 can move the sensor 12 to a position where the sensor 12 can measure the area, which is shielded by the first object and becomes a blind spot, more appropriately. Therefore, the control apparatus 100 according to the first embodiment can efficiently detect the target object 80 even when the second object is shielded by the first object.

The sensor control unit 140 moves the sensor 12 to the optimal viewpoint position determined by the position determination unit 120. Then, the sensor control unit 140 controls the sensor 12 so as to perform measurement at the viewpoint position to which the sensor 12 has moved (i.e., at the optimal viewpoint position). Then, the sensor control unit 140 acquires a distance image (3D measurement data) generated by the sensor 12. Further, the sensor control unit 140 outputs the 3D measurement data to the object recognition unit 114.

The search determination unit 122 determines whether or not a search of the storage object 90 has been completed (later-described S110 to S112 in FIG. 4). Then, when the search determination unit 122 determines that the search of the storage object 90 has been completed, a recognition result for the target object 80 is output to, for example, the interface unit 108 or the like. On the other hand, when the search determination unit 122 determines that the search of the storage object 90 has not been completed, later-described processes performed by the optimal viewpoint selection unit 124 are performed. Specifically, the search determination unit 122 determines whether or not a search of an area where the target object 80 can be placed (a placement available area) in the storage object 90 has been completed by using the 3D environmental information. Details will be described later. Note that the placement available area may be a flat surface (e.g., the top surface of the shelf board 92) on which the target object 80 can be placed, or a space (e.g., a space between upper and lower shelf boards 92) in which the target object 80 can be disposed.

Note that when the search of the storage object 90 by the sensor 12 has been completed, there is a high possibility that no target object 80 that has not been recognized exists in the storage object 90 (i.e., all the target objects 80 disposed in the storage object 90 have been recognized). That is, there is a high possibility that the measurement for detecting target objects 80 has been sufficiently performed. Therefore, performing further measurement by the sensor 12 is probably wasteful. Therefore, it is possible to prevent an unnecessary process from being performed by preventing the optimal viewpoint selection unit 124 from performing a process when the search determination unit 122 determines that the search of the storage object 90 has been completed as described in the first embodiment. Therefore, the control apparatus 100 according to the first embodiment can prevent or reduce an increase in the time taken to detect an object.

The optimal viewpoint selection unit 124 calculates viewpoint positions of the sensor 12 where the sensor 12 can measure the placement available area as candidates for the optimal viewpoint position (viewpoint candidates) according to the position and the shape of the storage object 90 in which the target object 80 can be disposed (later-described S122 in FIG. 4). For example, viewpoint positions from which the shelf board 92 of the storage object 90 cannot be measured are excluded from the viewpoint candidates. Further, the optimal viewpoint selection unit 124 selects the optimal viewpoint position from the viewpoint candidates. Details will be described later. As described above, by calculating viewpoint candidates, it is possible to exclude viewpoint positions that cannot contribute to the detection of the target object 80 depending on the position and the shape of the storage object 90 from the optimal viewpoint positions. Therefore, the control apparatus 100 according to the first embodiment can efficiently detect the target object 80.

Further, the optimal viewpoint selection unit 124 determines whether or not, among the viewpoint candidates, there is an unmeasured viewpoint position (an unmeasured position), i.e., a viewpoint position from which the sensor 12 can measure an area shielded by the recognized target object 80 (the first object) but has not performed measurement yet (later-described S150 in FIG. 4). Then, when the optimal viewpoint selection unit 124 determines that there is an unmeasured viewpoint position, it performs a process for determining an optimal viewpoint position. Details will be described later. The state where there is no unmeasured viewpoint position means a state where the target object 80 cannot be detected even when measurement is further performed. Therefore, by determining whether or not there is an unmeasured viewpoint position as described above, it is possible to terminate the process for selecting the optimal viewpoint position when there is no unmeasured viewpoint position. As a result, it is possible to improve the efficiency of the detection of the target object 80. That is, it is possible to finish the process for detecting target objects without performing a wasteful process.

Figure 4:
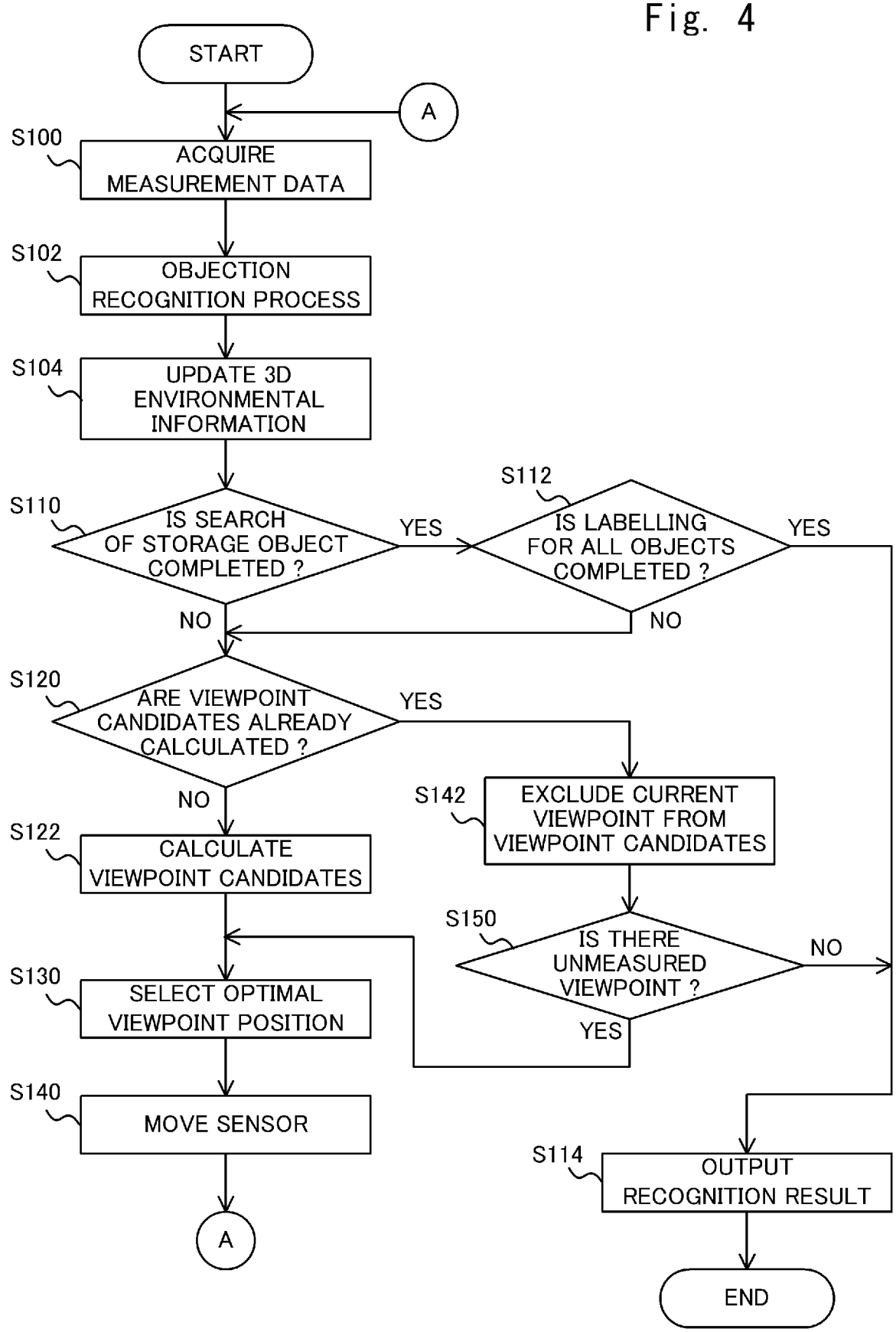
FIG. 4 is a flowchart showing an object detection method performed by the control apparatus according to the first embodiment.

FIG. 4 is a flowchart showing an object detection method performed by the control apparatus 100 according to the first embodiment. Firstly, the sensor control unit 140 controls the sensor 12 so as to perform measurement at the current viewpoint position, and acquires 3D measurement data (a distance image) from the sensor 12 (step S100). Then, as described above, the object recognition unit 114 performs an object recognition process by using the 3D measurement data and information stored in the information storage unit 112 (i.e., target object information, 3D environmental information, storage object information, etc.) (step S102). The information generation unit 116 updates the 3D environmental information by using the recognition result and the 3D measurement data (step S104).

In the example shown in FIG. 1, the target objects 80A and 80B are located relatively close to the front of the shelf board 92. Therefore, roughly the entire shape of each of them can be measured. Therefore, the object recognition unit 114 can recognize the target objects 80A and 80B. Then, the information generation unit 116 may add position information indicating the shape of the target object 80A in an area corresponding to the position where the target object 80A is disposed in a 3D virtual space represented by the 3D environmental information by using the target object information of the target object 80A. The information generation unit 116 may also perform a similar process for the target object 80B.

In contrast, the object 80C is located behind the target object 80B and hence a part of its shape cannot be measured. Therefore, there is a possibility that the object recognition unit 114 cannot recognize the target object 80C. In this case, the information generation unit 116 may add position information indicating a measured part of the target object 80C in an area corresponding to the position where the target object 80C is disposed in the 3D virtual space represented by the 3D environmental information by using the 3D measurement data.

Next, the search determination unit 122 determines whether or not the search of the storage object 90 has been completed (step S110). Specifically, the search determination unit 122 determines, by a later-described method, whether or not the measurement of the placement available area by the sensor 12 has been completed by using the 3D environmental information and the storage object information. Therefore, the process in the step S110 is performed in the 3D virtual space represented by the 3D environmental information.

When it is determined that the search of the storage object 90 has not been completed (No at S110), the search determination unit 122 determines that it is necessary to perform measurement from a viewpoint position from which measurement has not been performed. Therefore, in this case, the search determination unit 122 outputs a signal indicating that further measurement is necessary to the optimal viewpoint selection unit 124. As a result, the optimal viewpoint selection unit 124 performs a later-described process in a step S120.

On the other hand, when it is determined that the search of the storage object 90 has been completed (Yes at S110), the search determination unit 122 determines that at least a part of every target object 80 (e.g., an upper half, a left half, etc. of every target object 80) disposed in the placement available area has been measured. Therefore, the search determination unit 122 determines whether or not labeling has been performed for every target object 80 disposed in the storage object 90 (step S112). Note that the labeling means, as a result of recognition of a target objects 80 disposed in the storage object 90, associating identification information corresponding to that target object 80 with an area where that target object 80 is disposed.

Note that when roughly the entire shape of the target object 80 has been measured in the 3D measurement data (the 3D environmental information) (i.e., when roughly the entire image of the target object 80 is included in the distance image), labeling can be made by using the target object information. On the other hand, when the entire shape of the target object 80 has not been measured in the 3D measurement data (the 3D environmental information) (i.e., when a part of an image of the target object 80 is missing in the distance image and information necessary for the object recognition is insufficient), there is a possibility that the object recognition will end in failure even when the target object information is used. In such a case, labeling cannot be made.

When it is determined that labeling has been made for all the target objects 80 disposed in the storage object 90 (Yes at S112), the control apparatus 100 determines that all the target objects 80 disposed in the storage object 90 have been detected. Therefore, the control apparatus 100 outputs a recognition result to the interface unit 108 (step S114). Note that the recognition result is information indicating where each target object 80 is located. In other words, the recognition result is information indicating which area is occupied by which target object 80 in the 3D virtual space represented by the 3D environmental information.

When it is determined that labeling has still not been made for all the target objects 80 disposed in the storage object 90 (No at S112), the search determination unit 122 determines that further measurement is necessary to supplement the information which is insufficient to perform the labeling. In this case, the search determination unit 122 outputs a signal indicating that further measurement is necessary to the optimal viewpoint selection unit 124. As a result, the optimal viewpoint selection unit 124 performs the later-described process in the step S120.

Figure 5:
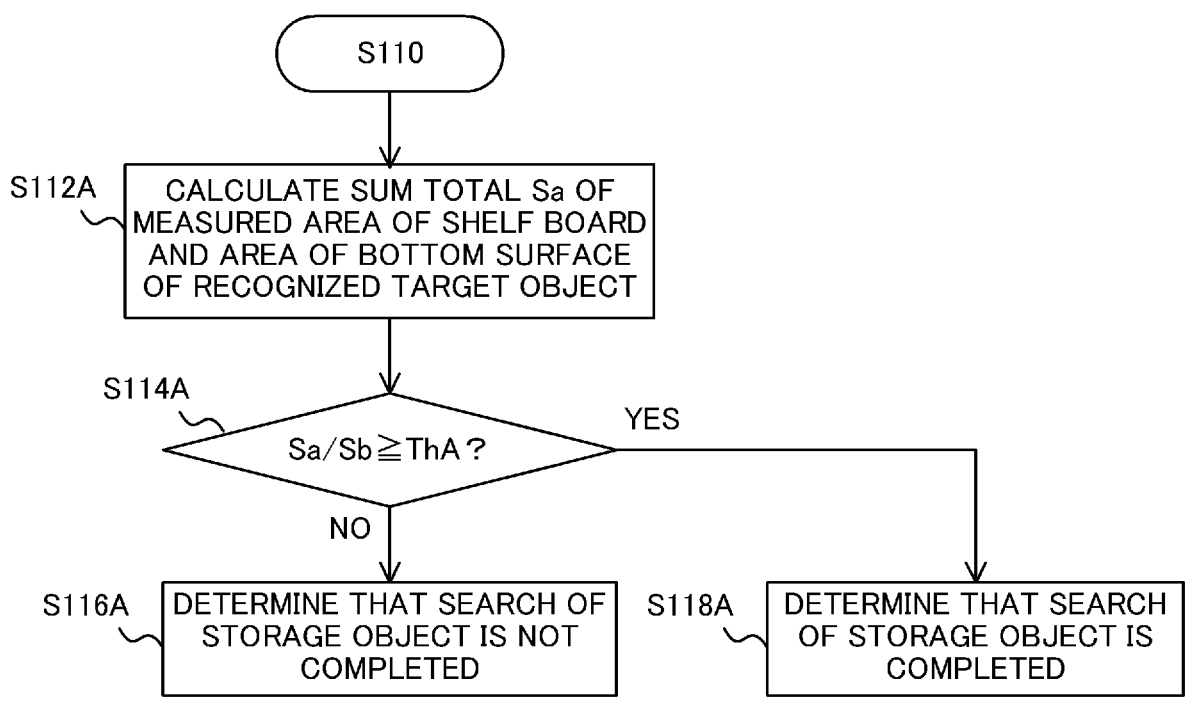
FIG. 5 is a flowchart showing a first example of a search completion determination method performed by a search determination unit according to the first embodiment.
Figure 6:
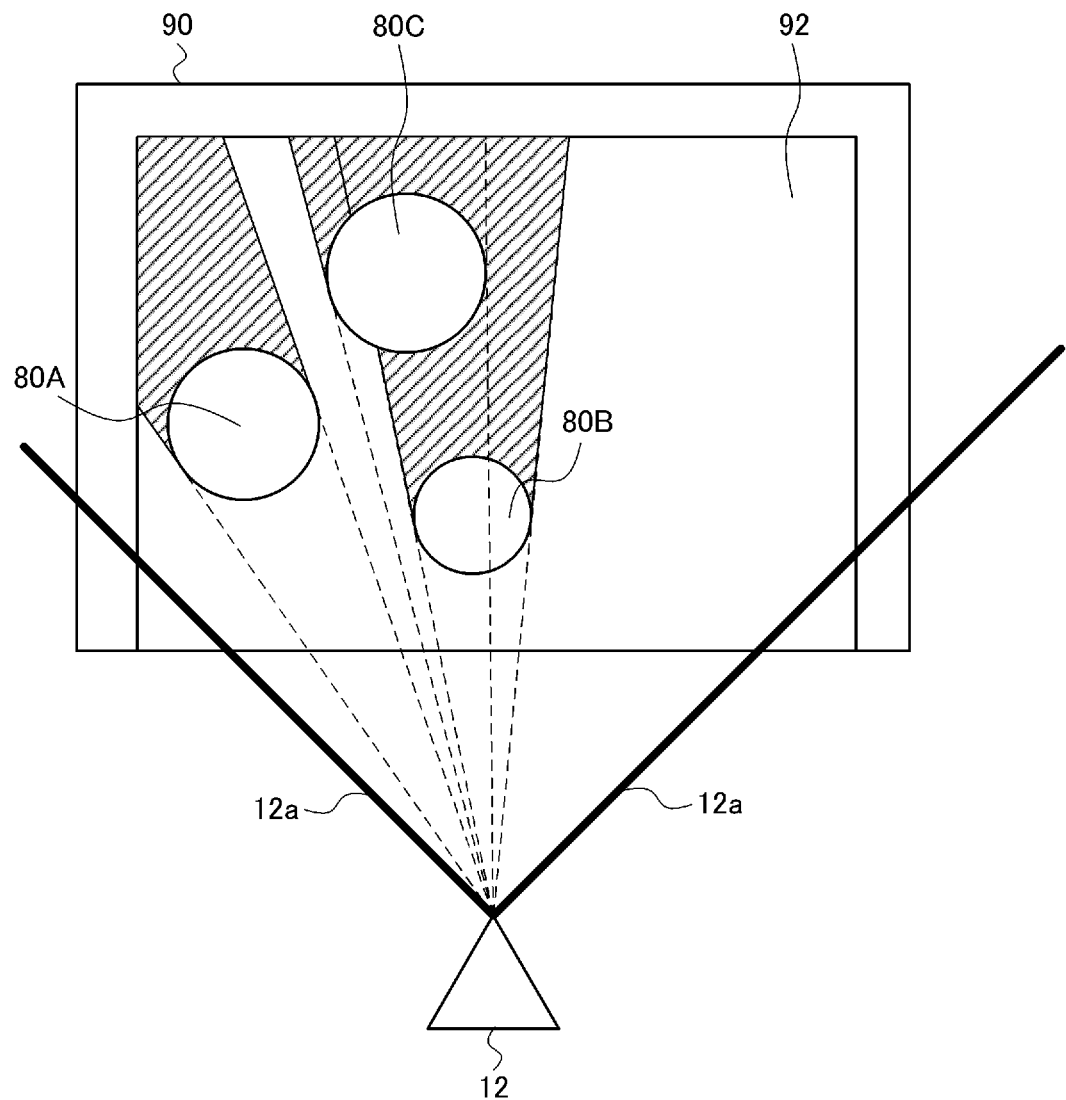
FIG. 6 is a diagram for explaining the first example shown in FIG. 5.

FIG. 5 is a flowchart showing a first example of a search completion determination method performed by the search determination unit 122 according to the first embodiment. Further, FIG. 6 is a diagram for explaining the first example shown in FIG. 5. FIG. 6 is a plan view showing a state in which target objects 80A, 80B and 80C are disposed on the shelf board 92 of the storage object 90 as viewed from above (as viewed in a Z-axis positive direction). Further, it is assumed that the target objects 80A, 80B and 80C have already been recognized.

The search determination unit 122 calculates a sum total Sa of a measured area (i.e., a measured size) of the shelf board 92 of the storage object 90 and areas (i.e., sizes) of bottom surfaces of the recognized target objects 80 (step S112A). Note that the measured area of the shelf board 92 can be geometrically calculated from the 3D measurement data and coordinate data in the 3D environmental information. Further, the areas of the bottom surfaces of the recognized target objects 80 are included in their corresponding target object information beforehand. In the example shown in FIG. 6, the measured area (i.e., the measured size) of the shelf board 92 corresponds to the area (i.e., the size) of the shelf board 92 excluding areas that are shielded by the target objects 80A, 80B and 80C, and hence become blind spots (i.e., hatched areas) within a field-of-view range 12*a*. Further, the areas (i.e., the sizes) of the bottom surfaces of the recognized target objects 80 corresponds to the sum total of the bottom areas of the target objects 80A, 80B and 80C. Note that when the target object 80C has not been recognized, the bottom area of the target object 80C is excluded from the sum total Sa.

The search determination unit 122 determines whether or not a ratio of the sum total Sa to the area Sb of the shelf board 92, i.e., a ratio Sa/Sb is equal to or larger than a predetermined threshold value ThA (step S114A). Note that the area Sb of the shelf board 92 can be acquired (i.e., calculated) from the storage object information. The area Sb may be included in the storage object information. When the ratio Sa/Sb is smaller than the threshold value ThA (Sa/Sb<ThA) (No at S114A), the search determination unit 122 determines that the search of the storage object 90 has not been completed (step S116A). On the other hand, when the ratio Sa/Sb is equal to or larger than the threshold value ThA (Sa/Sb≥ThA) (Yes at S114A), the search determining unit 122 determines that the search of the storage object 90 has been completed (step S118A). Note that the amount of unmeasured areas and the number of unrecognized target objects 80 can be reduced by having the sensor 12 perform measurement in a viewpoint position(s) determined by the later-described process in the step S130. Therefore, a possibility that the relation "Sa/Sb≥ThA" holds can be increased by having the sensor 12 repeat measurements in viewpoint positions determined by the process in the step S130.

Figure 7:
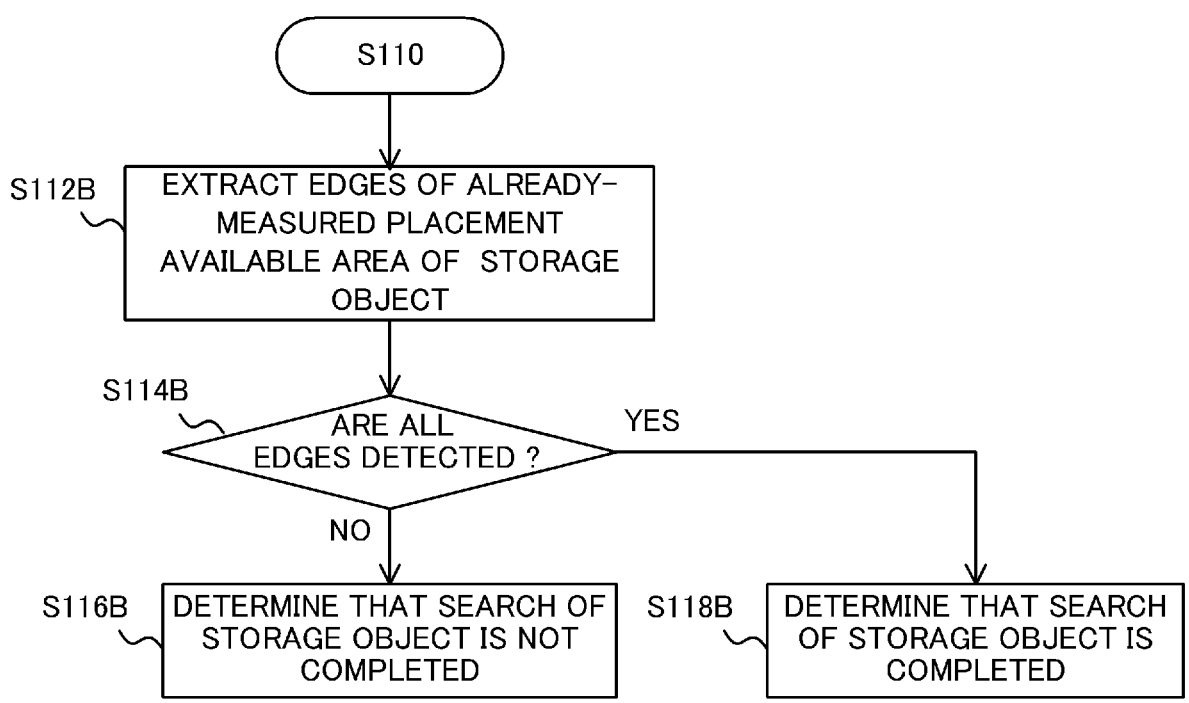
FIG. 7 is a flowchart showing a second example of the search completion determination method performed by the search determination unit according to the first embodiment.
Figure 8:
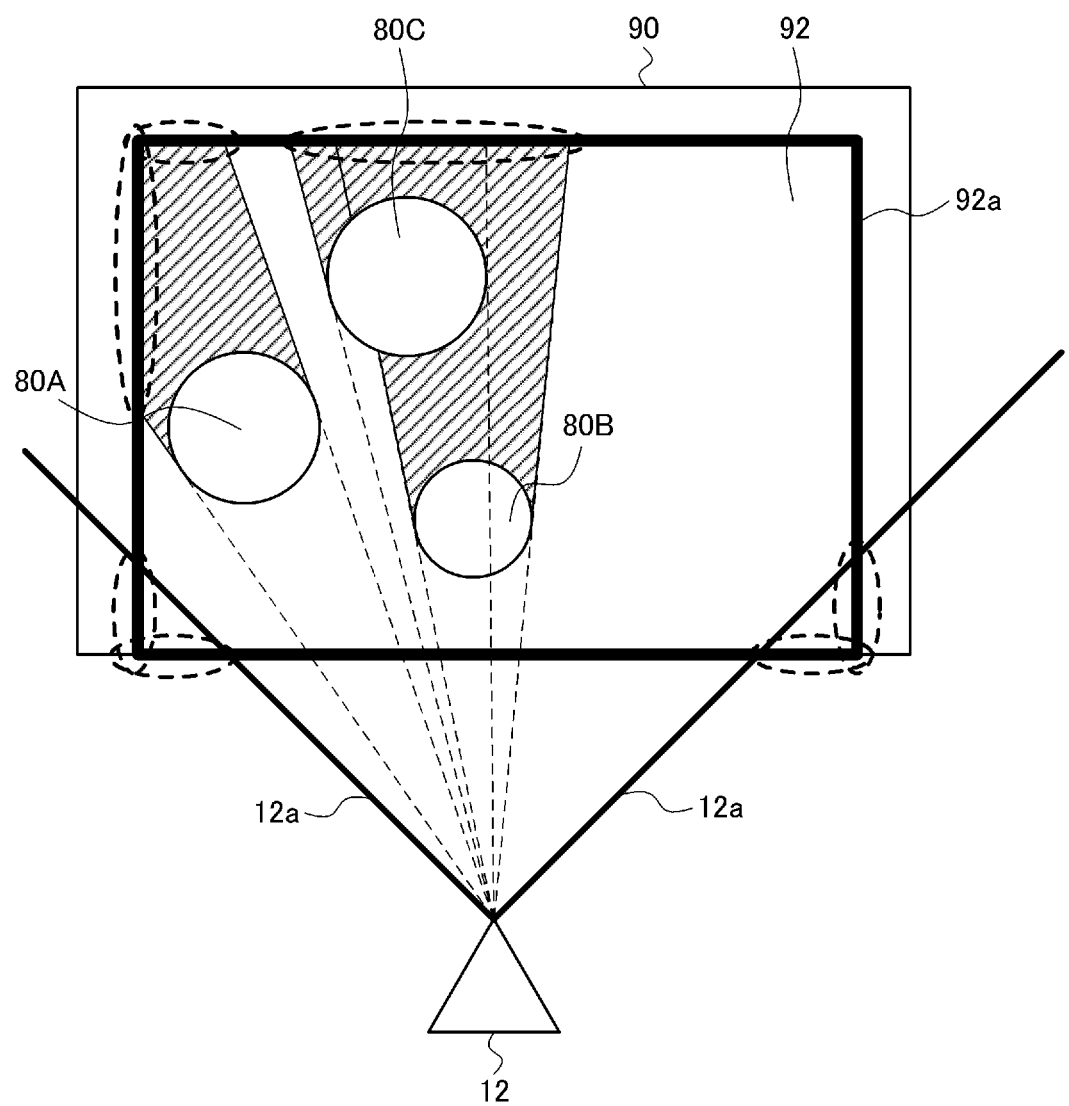
FIG. 8 is a diagram for explaining the second example shown in FIG. 7.

FIG. 7 is a flowchart showing a second example of the search completion determination method performed by the search determination unit 122 according to the first embodiment. Further, FIG. 8 is a diagram for explaining the second example shown in FIG. 7. FIG. 8 is a plan view showing a state in which target objects 80A, 80B and 80C are disposed on the shelf board 92 of the storage object 90 as viewed from above (as viewed in a Z-axis positive direction).

The search determination unit 122 extracts edges of the already-measured placement available area of the storage object 90 from the measurement data (the 3D environmental information) (step S112B). Note that when the placement available area corresponds to the shelf board 92, edges 92*e* of the placement available area are boundaries between the shelf board 92 and the wall surfaces 94 (indicated by bold lines in FIG. 8). Note that since coordinate data of the shelf board 92 is already included in the storage object information (the 3D environmental information), it is easy to recognize which areas correspond to the edges 92*e* in the measurement data (the 3D environmental information).

The search determination unit 122 determines whether or not all the edges 92*e* of the placement available area have been detected (step S114B). When all the edges 92*e* have not been detected (No at S114B), the search determination unit 122 determines that the search of the storage object 90 has not been completed (step S116B). On the other hand, when all the edges 92*e* have been detected (Yes at S114B), the search determining unit 122 determines that the search of the storage object 90 has been completed (step S118B). In the example shown in FIG. 8, no edge 92*e* is detected in parts that become blind spots due to the target objects 80 and parts located outside the field-of-view range 12*a* (indicated by broken-line ellipses in FIG. 8). Therefore, in this case, the search determination unit 122 determines that the search of the storage object 90 has not been completed. Note that the amount of unmeasured edges 92*e* can be reduced by having the sensor 12 perform measurement in a viewpoint position(s) determined by the later-described process in the step S130. Therefore, all the edges 92*e* could be detected by having the sensor 12 repeat measurements in viewpoint positions determined by the process in the step S130.

Note that even when the placement available area is a 3D space, the above-described first and second examples can be applied. In the first example, the search determining unit 122 may compare the sum total of the volume of a measured space in the storage object 90 and the volumes of recognized target objects 80 with the volume of the placement available area in the storage object 90. In the second example, the search determination unit 122 may determine whether all the wall surfaces 94 around the shelf board 92 have been measured.

The optimal viewpoint selection unit 124 determines whether or not viewpoint candidates have already been calculated (step S120). When the viewpoint candidates have not been calculated (No at S120), the optimal viewpoint selection unit 124 calculates viewpoint candidates (step S122). On the other hand, when the viewpoint candidates have already been calculated (Yes at S120), the optimal viewpoint selection unit 124 examines other viewpoint positions included in the viewpoint candidates (S142 to S150). Note that the process in the step S122 may be performed only once, i.e., performed only in the first loop.

In the step S120, the optimal viewpoint selection unit 124 calculates viewpoint positions of the sensor 12 from which the sensor 12 can measure the placement available area as viewpoint candidates by using the storage object information and the 3D environmental information. In this case, the optimal viewpoint selection unit 124 takes only the storage object 90 into consideration and does not take the presence of target objects 80 disposed in the storage object 90 into consideration. Note that the process in the step S122 is performed in the 3D virtual space represented by the 3D environmental information.

Specifically, the optimal viewpoint selection unit 124 calculates, for example, a viewpoint position in which at least a part of the placement available area of the storage object 90 is included in the field-of-view range 12a (the viewing angle) of the sensor 12 by using the storage object information and the 3D environmental information. The optimal viewpoint selection unit 124 calculates, for example, a viewpoint position in which at least a part of the shelf board 92 of the storage object 90 is included. For example, the optimal viewpoint selection unit 124 determines whether or not an image of the shelf board 92 is included in the field-of-view range 12a (the viewing angle) of the sensor 12 when the viewpoint position is moved in the 3D virtual space. Further, when the image of the shelf board 92 is included in the field-of-view range 12a, the optimal viewpoint selection unit 124 defines that viewpoint position as a viewpoint candidate.

Figure 9:
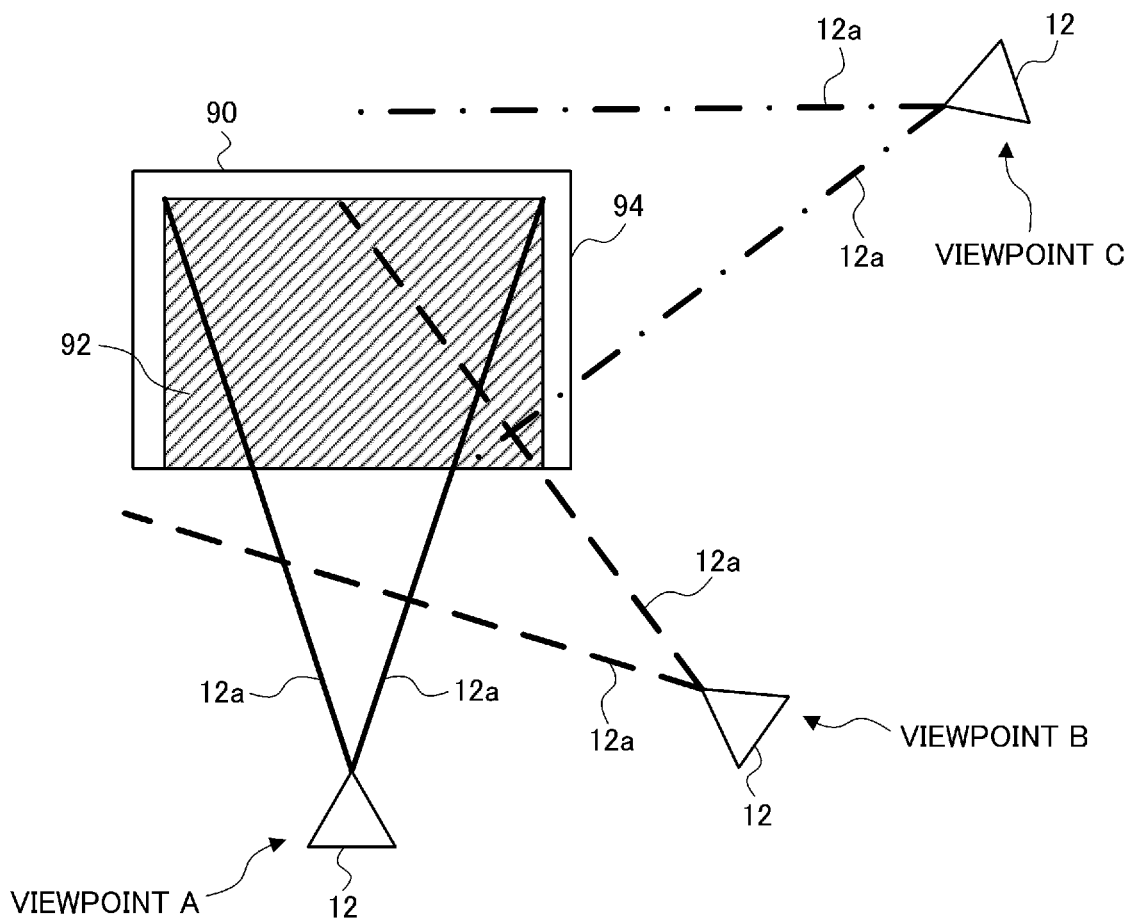
FIG. 9 is a diagram for explaining a viewpoint candidate calculation method according to the first embodiment.
Figure 10:
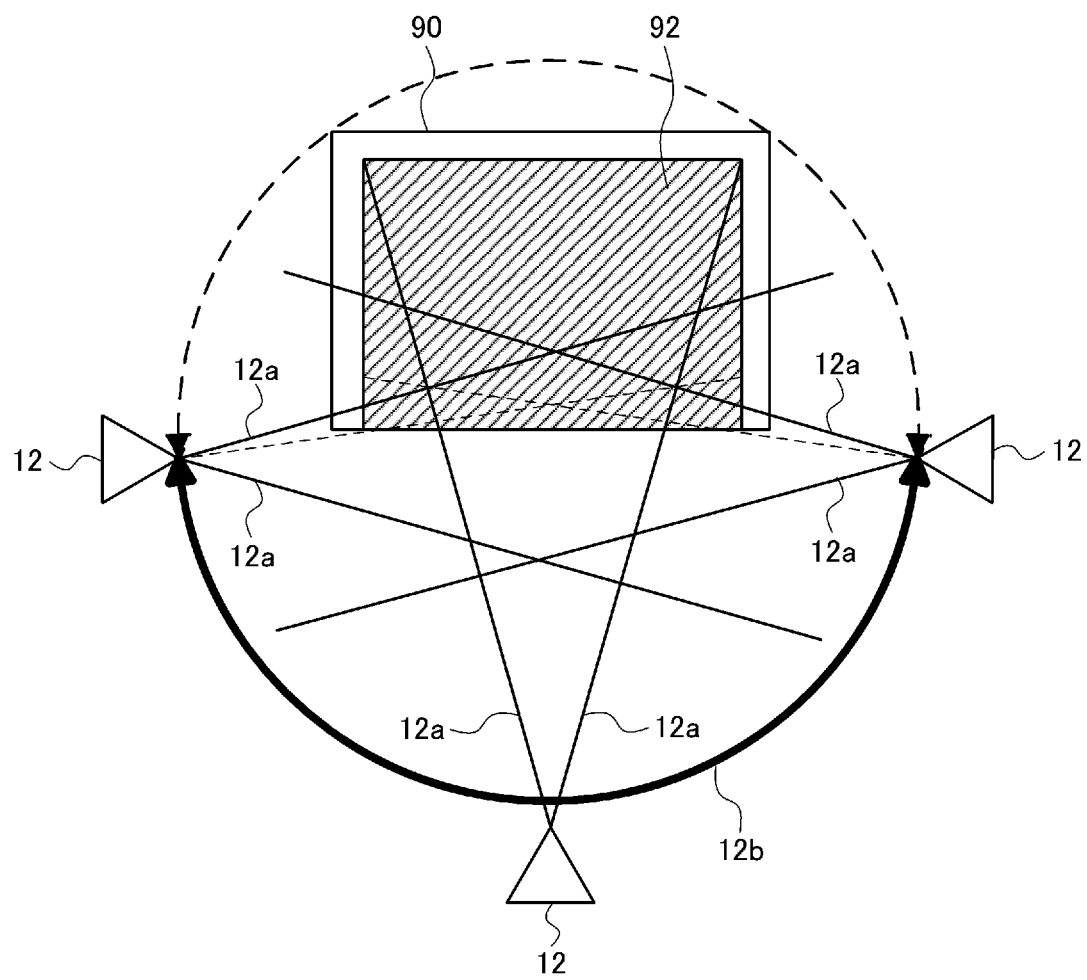
FIG. 10 is a diagram for explaining the viewpoint candidate calculation method according to the first embodiment.
Figure 11:
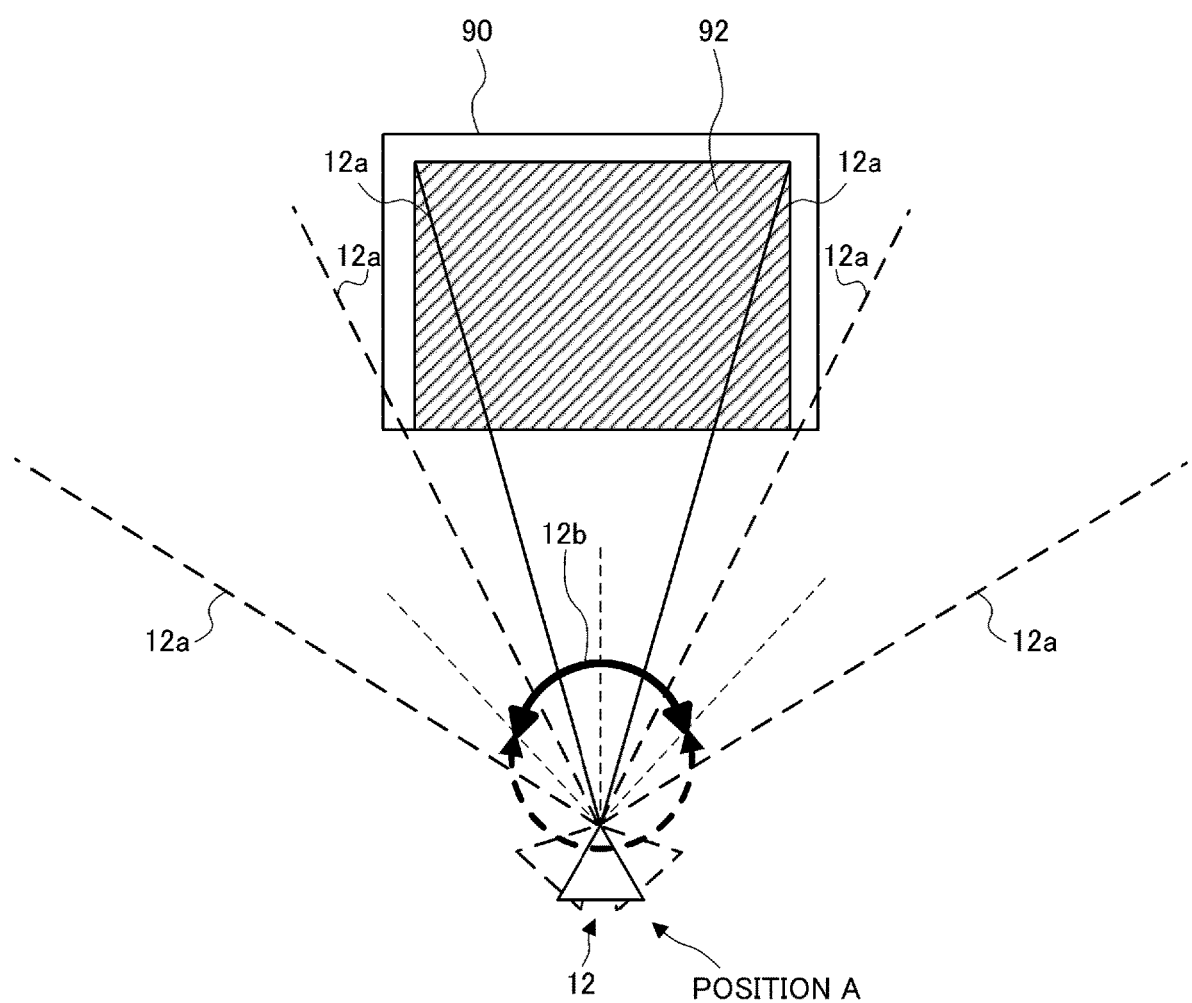
FIG. 11 is a diagram for explaining the viewpoint candidate calculation method according to the first embodiment.

FIGS. 9 to 11 are diagrams for explaining a viewpoint candidate calculation method according to the first embodiment. In FIG. 9, at least a part of the shelf board 92 is not shielded by the wall surface 94 and is included in the field-of-view range 12a at either of viewpoints A and B. Therefore, the viewpoints A and B are included in the viewpoint candidates. In contrast, at a viewpoint C, since the shelf board 92 is entirely shielded by the wall surface 94, no area of the shelf board 92 is included in the field-of-view range 12a. Therefore, the viewpoint C is not included in the viewpoint candidates.

In FIG. 10, a range of viewpoint candidates 12b in which the sensor 12 can be positioned is indicated by a bold-line arrow. The sensor 12 can measure at least a part of the shelf board 92 at any viewpoint in this range of viewpoint candidates 12b. Meanwhile, no part of the shelf board 92 can be measured in a range of viewpoints indicated by a broken-line arrow and hence this range of viewpoints is excluded from the viewpoint candidates.

In FIG. 11, a range of viewpoint candidates 12b which represents a range of postures (orientations) of the sensor 12 at a position A is indicated by a bold-line arrow. The sensor 12 can measure the shelf board 92 in any viewpoint in this range of viewpoint candidates 12b. Meanwhile, the shelf board 92 cannot be measured in a range of viewpoints indicated by a broken-line arrow and hence this range of viewpoints is excluded from the viewpoint candidates.

Next, the optimal viewpoint selection unit 124 selects an optimal viewpoint position, which is an optimal viewpoint position as the next viewpoint position of the sensor 12, from the viewpoint candidates (step S130). Specifically, the optimal viewpoint selection unit 124 selects, as the optimal viewpoint position, a position where the sensor 12 can measure a target object 80 (e.g., the target object 80C in FIG. 1) that is partially shielded by an already-recognized target object(s) 80 (e.g., the target object(s) 80A or/and 80B in FIG. 1). Further, the optimal viewpoint selection unit 124 selects, as the optimal viewpoint position, a position where the sensor 12 can measure an area that is shielded by the already-recognized target object(s) 80 (e.g., the target object(s) 80A or/and 80B in FIG. 1). That is, the position determination unit 120 determines, by using the 3D environmental information, a position of the sensor 12 where the sensor 12 can take a distance image in which a size of an area shielded by the already-recognized target object(s) 80 (e.g., the target object(s) 80A or/and 80B in FIG. 1) is larger as the optimal viewpoint position.

Figure 12:
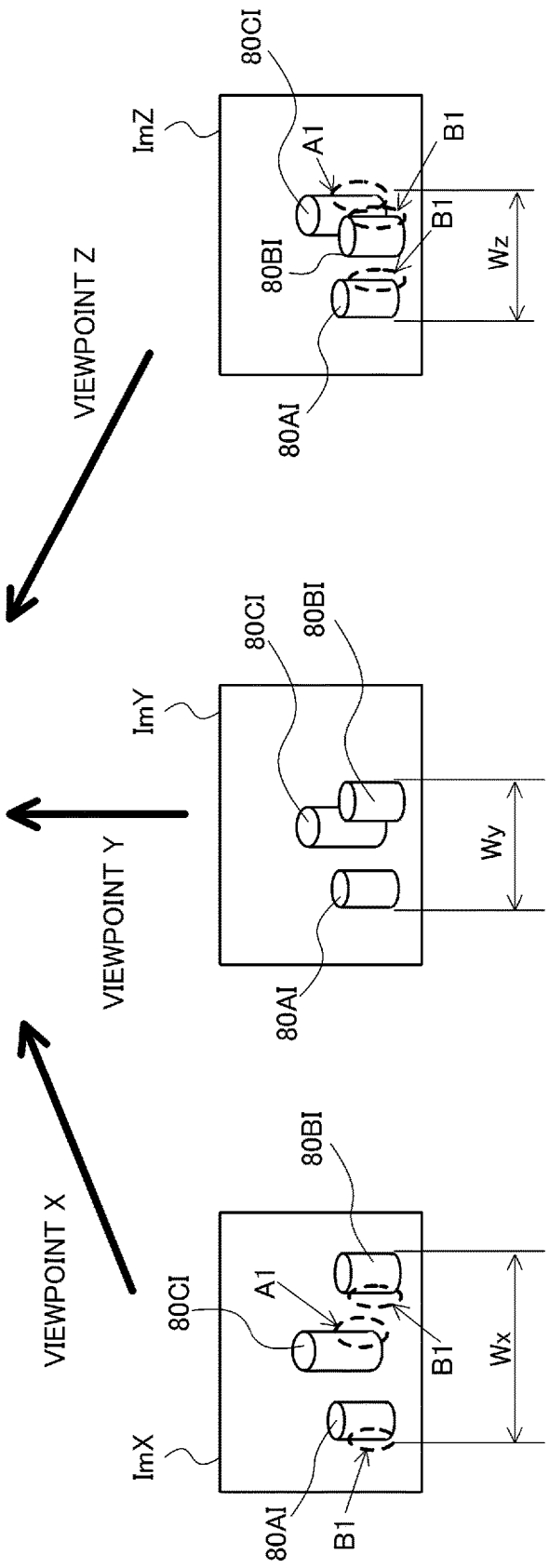
FIG. 12 is a diagram for explaining processes performed by an optimal viewpoint selection unit according to the first embodiment.
Figure 13:
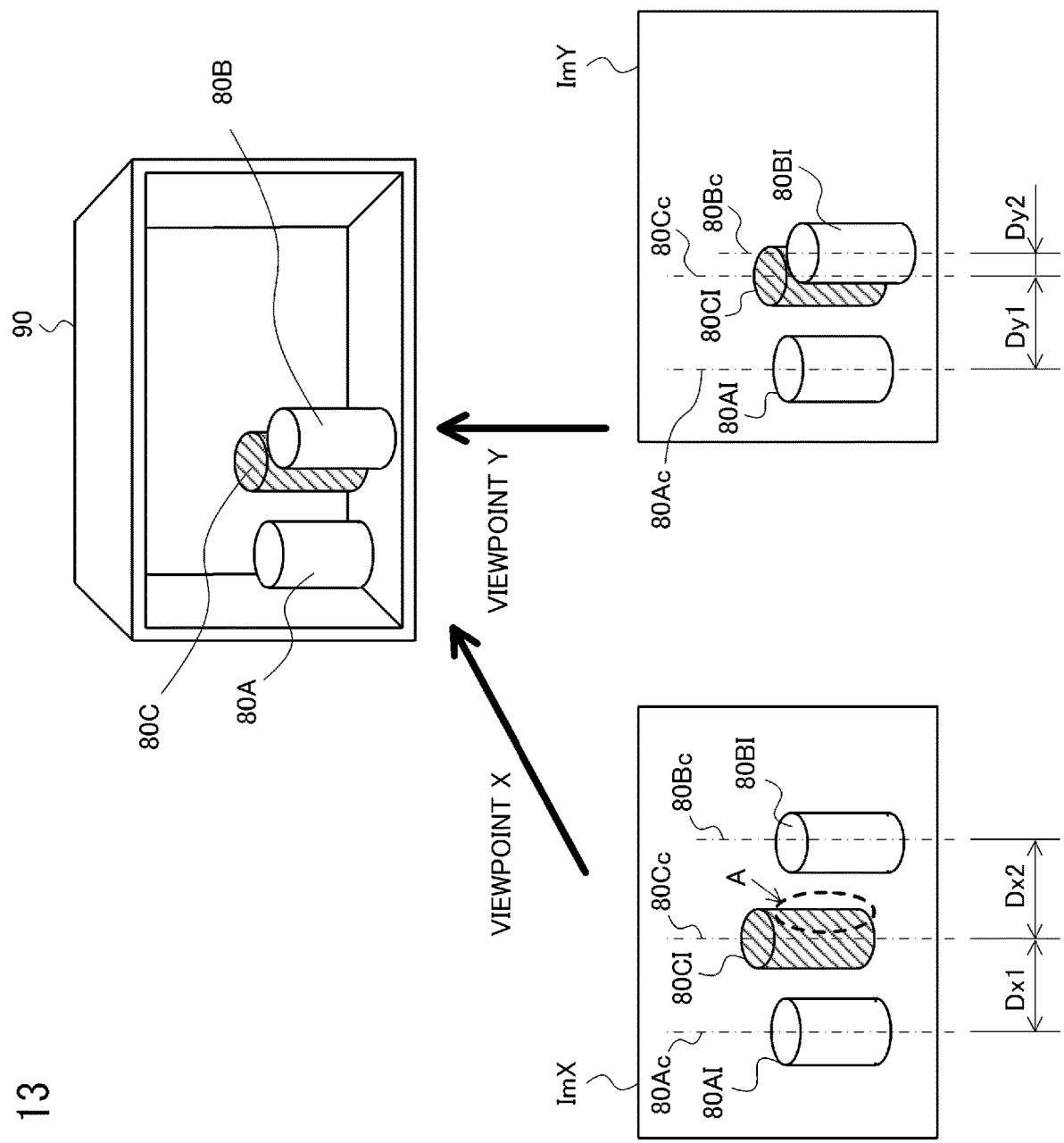
FIG. 13 is a diagram for explaining processes performed by the optimal viewpoint selection unit according to the first embodiment.
Figure 14:
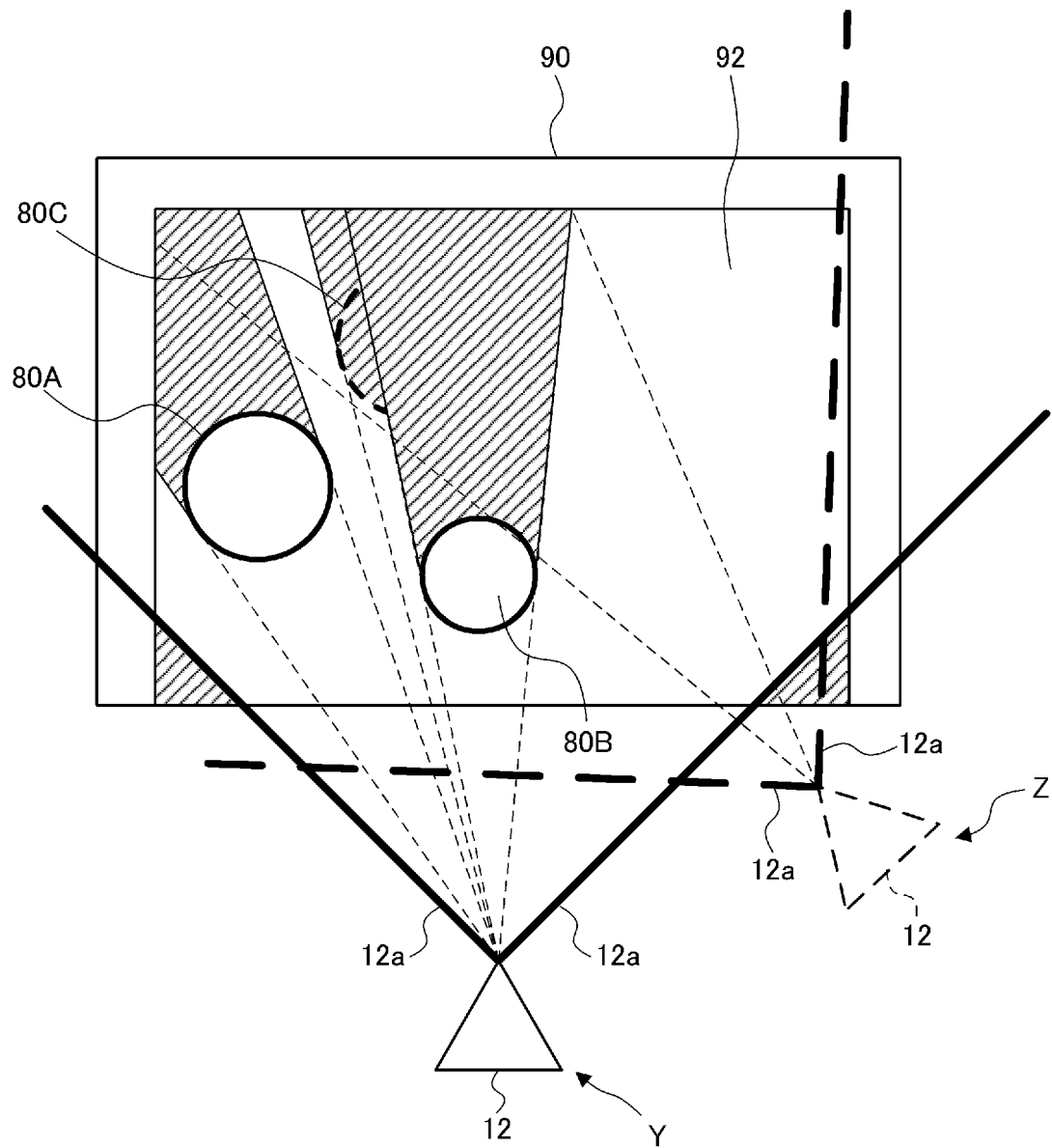
FIG. 14 is a diagram for explaining processes performed by the optimal viewpoint selection unit according to the first embodiment.

FIGS. 12 to 14 are diagrams for explaining processes performed by the optimal viewpoint selection unit 124 according to the first embodiment. The examples shown in FIGS. 12 and 13 can be used to measure an object 80 (e.g., the object 80C in FIG. 1) that has not been recognized because a part of it is shielded, though another part of it has been measured. Further, the example shown in FIG. 14 can be used in a case where it is unknown whether or not a target object 80 is disposed in an area(s) corresponding to a blind spot(s) of a recognized target object(s) 80. The case of the example shown in FIG. 1 is described hereinafter.

In the example shown in FIG. 12, the optimal viewpoint selection unit 124 selects, for example, a viewpoint position in which an unrecognized target object 80 and target objects 80 located around this unrecognized target object 80 are widely distributed (i.e., scattered over a wide area) in the field of view (the angle of view) of the sensor 12. Specifically, firstly, the optimal viewpoint selection unit 124 excludes position data related to the storage object 90 from the 3D environmental information as indicated by broken lines in FIG. 12. Then, in the 3D virtual space represented by the 3D environmental information, the optimal viewpoint selection unit 124 extracts, for each of a plurality of viewpoint positions imaginarily defined in the range of viewpoint positions calculated in the process in the step S122, a distance image that is obtained when the aforementioned plurality of target objects 80 are viewed from that imaginarily-defined viewpoint position. Note that the optimal viewpoint selection unit 124 can generate a distance image that is obtained when the target objects 80 are viewed from an imaginarily-defined viewpoint position by using sensor information indicating an angle of view, etc. of the sensor 12.

Then, the optimal viewpoint selection unit 124 calculates, for each of the distance images, a distance between both ends of the plurality of target objects 80. The optimal viewpoint selection unit 124 selects a viewpoint position corresponding to a distance image having the longest distance between both ends of the targets objects 80 as an optimal viewpoint position. Note that the optimal viewpoint selection unit 124 may select a viewpoint position corresponding to a distance image in which the distance between both ends of the targets objects 80 is greater than a predetermined threshold as the optimal viewpoint position. Note that "the distance between both ends" may not be an actual distance, but may be a distance in the distance image. Therefore, "the distance between both ends" may correspond to the number of pixels in the distance image (This also applies to the example shown in FIG. 13). Note that in a distance image in which "the distance between both ends" is larger may include a larger area that includes a part of the unrecognized target object 80.

In the example shown in FIG. 12, a distance image ImX including target object images 80AI, 80BI and 80CI, which are images of the target objects 80A, 80B and 80C, respectively, viewed from a viewpoint X, is extracted. Similarly, distance images ImY and ImZ that include target object images 80AI, 80BI and 80CI viewed from viewpoints Y and Z, respectively, are extracted. Then, the optimal viewpoint selection unit 124 calculates a distance Wx between both ends of the target objects 80A, 80B and 80C in the distance image ImX. Similarly, the optimal viewpoint selection unit 124 calculates distances Wy and Wz between both ends of the target objects 80A, 80B and 80C in the distance images ImY and ImZ, respectively. Then, the optimal viewpoint selection unit 124 determines as follows: Wx>Wy; and Wx>Wz. That is, the optimal viewpoint selection unit 124 determines that the distance image ImX has the longest distance between both ends. Therefore, the optimal viewpoint selection unit 124 selects the viewpoint X as an optimal viewpoint position. In this way, in the example shown in FIG. 12, the position determination unit 120 determines, as the optimal viewpoint position, a position of the sensor 12 where the sensor 12 can take a distance image in which a size of an area (a part of the unrecognized target object 80C) shielded by an already-recognized target object(s) 80 is larger.

Incidentally, when measurement has been made only from a viewpoint corresponding to the viewpoint Y, a part indicated by an arrow A1 in FIG. 12 has not been actually measured yet by the sensor 12 at the time of this process. Therefore, since position data of the part indicated by the arrow A1 is not included in the 3D environmental information, this part may be missing in the distance images ImX and ImZ (This also applies to FIG. 13). Further, when measurement has been made only from a viewpoint corresponding to the viewpoint Y, a part indicated by an arrow B1 has also not been measured yet. However, since the target objects 80A and 80B have already been recognized, it is possible to draw the part indicated by the arrow B1 by using the target object information.

In the example shown in FIG. 13, the optimal viewpoint selection unit 124 selects, for example, a viewpoint position in which a distance between the center of the unrecognized target object 80 and the center of an already-recognized target object(s) 80 in the distance image becomes larger. Specifically, the optimal viewpoint selection unit 124 calculates a central axis(es) of the recognized target object(s) 80 in the 3D virtual space represented by the 3D environmental information by using the target object information of the recognized target object 80. Note that the target object information may include information indicating the central axis of the target object(s) 80 beforehand.

Further, the optimal viewpoint selection unit 124 calculates a central axis of the unrecognized target object 80 in the Z-axis direction by using the 3D measurement data. Note that in the 3D measurement data, only a part of the unrecognized target object 80 has been measured. Therefore, the optimal viewpoint selection unit 124 calculates the central axis of the unrecognized target object 80 in the range that can be estimated from the measured part. For example, when the top surface of the unrecognized target object 80 has already been measured, the optimal viewpoint selection unit 124 may presume (i.e., regard) an axis that passes through the center of gravity of the top surface as the central axis. Further, when the left and right side surfaces of the unrecognized target object 80 have already been measured, the optimal viewpoint selection unit 124 may presume (i.e., regard) an axis that passes through the middle between the left and right side surfaces as the central axis.

Then, in the 3D virtual space represented by the 3D environmental information, the optimal viewpoint selection unit 124 extracts, for each of a plurality of viewpoint positions imaginarily defined in the range of viewpoint candidates calculated in the process in the step S122, a distance image that is obtained when the aforementioned plurality of target objects 80 are viewed from that imaginarily-defined viewpoint position. Then, the optimal viewpoint selection unit 124 calculates, for each of the distance images, a distance between the central axis of the unrecognized target object 80 and the central axis(es) of the already-recognized target object(s) 80. The optimal viewpoint selection unit 124 selects a viewpoint position corresponding to a distance image having the longest distance between the centers of these target objects as an optimal viewpoint position. Note that the optimal viewpoint selection unit 124 may select a viewpoint position corresponding to a distance image in which the distance between the centers of the target objects is greater than a predetermined threshold as the optimal viewpoint position. Note that in a distance image in which "the distance between the centers" is larger may include a larger area that includes a part of the unrecognized target object 80.

In the example shown in FIG. 13, distance images ImX and ImY that include target object images 80AI, 80BI and 80CI as viewed from viewpoints X and Y, respectively, are extracted. Then, the optimal viewpoint selection unit 124 calculates a distance Dx1 between a central axis 80Cc of the target object 80C and a central axis 80Ac of the target object 80A, and a distance Dx2 between the central axis 80Cc of the target object 80C and a central axis 80Bc of the target object 80B in the range image ImX. Similarly, the optimal viewpoint selection unit 124 calculates a distance Dy1 between a central axis 80Cc of the target object 80C and a central axis 80Ac of the target object 80A, and a distance Dy2 between the central axis 80Cc of the target object 80C and a central axis 80Bc of the target object 80B in the range image ImY. Then, for example, the optimal viewpoint selection unit 124 compares an average value (or a maximum value) of the inter-central-axis distances Dx1 and Dx2 in the distance image ImX with an average value (or a maximum value) of the inter-central-axis distances Dy1 and Dy2 in the distance image ImY. Then, the optimal viewpoint selection unit 124 determines that the distance image ImX has a larger average value (or a larger maximum value) and hence selects the viewpoint X as an optimal viewpoint position. In this way, in the example shown in FIG. 13, the position determination unit 120 determines, as the optimal viewpoint position, a position of the sensor 12 where the sensor 12 can take a distance image in which a size of an area (a part of the unrecognized target object 80C) shielded by an already-recognized target object(s) 80 is larger.

Note that in the example shown in FIG. 13, only the distance between the central axes of the target objects 80 needs to be obtained. Therefore, in the example shown in FIG. 13, images of target objects 80 themselves do not need to be included in the extracted distance image. That is, only the central axis of each target object 80 needs to be included in the extracted distance image.

In the example shown in FIG. 14, the optimal viewpoint selection unit 124 selects, for example, a viewpoint position in which an unmeasured area in the placement available area of the storage object 90 is included in the field-of-view range 12a as much as possible. Note that the unmeasured area means areas that were shielded by the target object(s) 80 or located outside the field-of-view range 12a when measurement was performed from an already-selected viewpoint position(s). FIG. 14 is a plan view showing a state in which target objects 80A, 80B and 80C are disposed on the shelf board 92 of the storage object 90 as viewed from above (as viewed in a Z-axis positive direction). Further, it is assumed that the target objects 80A and 80B have already been recognized.

The optimal viewpoint selection unit 124 extracts an unmeasured area from the placement available area of the storage object 90. Specifically, the optimal viewpoint selection unit 124 geometrically extracts an area of the shelf board 92 that has not been measured (i.e., an unmeasured area of the shelf board 92) from the 3D environmental information, the 3D measurement data, and the storage object information. More specifically, the optimal viewpoint selection unit 124 extracts, as the unmeasured area, an area that is not indicated as being already-measured in the 3D measurement data (the 3D environmental information) from position data of the top surface of the shelf board 92 included in the storage object information.

Then, in the 3D virtual space represented by the 3D environmental information, the optimal viewpoint selection unit 124 extracts, for each of a plurality of viewpoint positions imaginarily defined in the range of viewpoint candidates, a distance image that is obtained when the shelf board 92 is viewed from that imaginarily-defined viewpoint position. Then, the optimal viewpoint selection unit 124 calculates, for each of the distance images, a size of the unmeasured area of the shelf board 92. The optimal viewpoint selection unit 124 selects a viewpoint position corresponding to a distance image having the largest size of the unmeasured area as an optimal viewpoint position. Note that "the size of the unmeasured area" may not be an actual size, but may be a size in the distance image. Therefore, "the size of the unmeasured area" corresponds to the number of pixels in a part corresponding to the unmeasured area in the distance image.

In the example shown in FIG. 14, the optimal viewpoint selection unit 124 determines that an area(s) that cannot be measured when the sensor 12 performs measurement from a viewpoint position indicated by an arrow Y (i.e., hatched areas in FIG. 14) will be included in the field-of-view range 12a as much as possible when the sensor 12 performs measurement from a viewpoint position indicated by an arrow Z. Therefore, the optimal viewpoint selection unit 124 selects the viewpoint position corresponding to the arrow Z as an optimal viewpoint position. In this way, in the example shown in FIG. 14, the position determination unit 120 determines, as the optimal viewpoint position, a position of the sensor 12 where the sensor 12 can take a distance image in which a size of an area shielded by an already-recognized target object(s) 80 is larger.

Note that in addition to the above-described examples shown in FIGS. 12 to 14, the optimal viewpoint selection unit 124 may determine the optimal viewpoint position based on discontinuity in measured position data of an unrecognized target object 80. Specifically, the optimal viewpoint selection unit 124 may determines, as the optimal viewpoint position, a position of the sensor 12 from which an image in which, in the already-measured position data of the unrecognized target object 80, a part that became discontinuous due to an already-recognized target object 80, rather than the storage object 90, becomes larger is taken. Note that "the part that became discontinuous due to the already-recognized target object 80" means an area that is shielded by the already-recognized target object 80. Further, the optimal viewpoint selection unit 124 may perform a process for selecting an optimal viewpoint position in which at least two of the above-described examples shown in FIGS. 12 to 14 and the above-described other example are combined.

The sensor control unit 140 controls the driving unit 14 and thereby moves the sensor 12 to the viewpoint position determined by the process in the step S130 (step S140). Then, the sensor control unit 140 controls the sensor 12 so as to perform measurement at the viewpoint position to which the sensor 12 has moved, and acquires 3D measurement data (a distance image) from the sensor 12 (S100).

Then, the object recognition unit 114 performs the above-described object recognition process (S102). A possibility that an unrecognized target object 80 (e.g., the target object 80C) shown in FIG. 1, etc. can be recognized is increased by performing measurement at the optimal viewpoint position.

Then, after the process in the step S104 is performed, the search determination unit 122 determines whether or not the search of the storage object 90 has been completed (S110), and determines whether or not labeling has been made for all the target objects 80 (S112). For example, when the target object 80C is recognized and it is determined that no other target object 80 is disposed in the storage object 90 (Yes at S110 and Yes at S112), the control apparatus 100 determines that the detection of all the target objects 80 disposed in the storage object 90 has been completed and outputs a recognition result (S114). On the other hand, when the target object 80C has not been recognized yet or when it is determined that it is unknown whether or not another target object 80 is disposed in the storage object 90 (No at S110 or No at S112), the control apparatus 100 proceeds to the process in the step S120.

Then, since the viewpoint candidates have already been calculated in the process in the step S120 (Yes at S120), the optimal viewpoint selection unit 124 examines other viewpoint positions included in the viewpoint candidates (S142 to S150). Specifically, to prevent the same measurement from being performed again, the optimal viewpoint selection unit 124 excludes the current viewpoint position, i.e., the viewpoint position from which measurement has already been performed from the viewpoint candidates (step S142). Note that the optimal viewpoint selection unit 124 may exclude the current viewpoint position and its surroundings from the viewpoint candidates. Then, the optimal viewpoint selection unit 124 determines whether or not there is an unmeasured viewpoint position in the viewpoint candidates (step S150). Specifically, the optimal viewpoint selection unit 124 determines whether or not there is a viewpoint position from which the sensor 12 can measure an area shielded by the recognized target object 80 but has not performed measurement yet (i.e., an unmeasured viewpoint position).

When it is determined that there is an unmeasured viewpoint position (an unmeasured position) (Yes at S150), the optimal viewpoint selection unit 124 performs the process in the step S130, i.e., selects an optimal viewpoint position. On the other hand, when it is determined that there is no unmeasured viewpoint position (No at S150), the optimal viewpoint selection unit 124 determines that further detection is impossible. Then, the control apparatus 100 outputs recognition results obtained up to this point to the interface unit 108 or the like (step S114).

Figure 15:
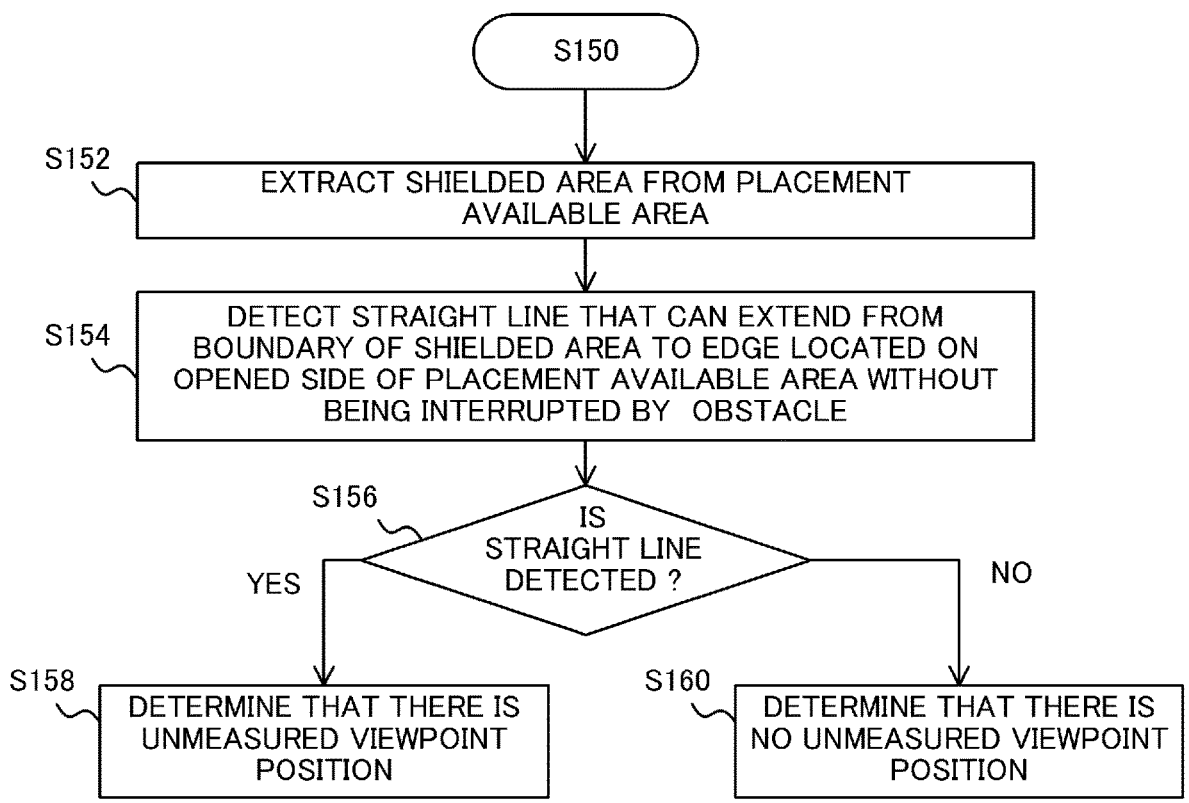
FIG. 15 is a flowchart showing an example of a process for determining whether or not there is an unmeasured viewpoint position according to the first embodiment.
Figure 16:
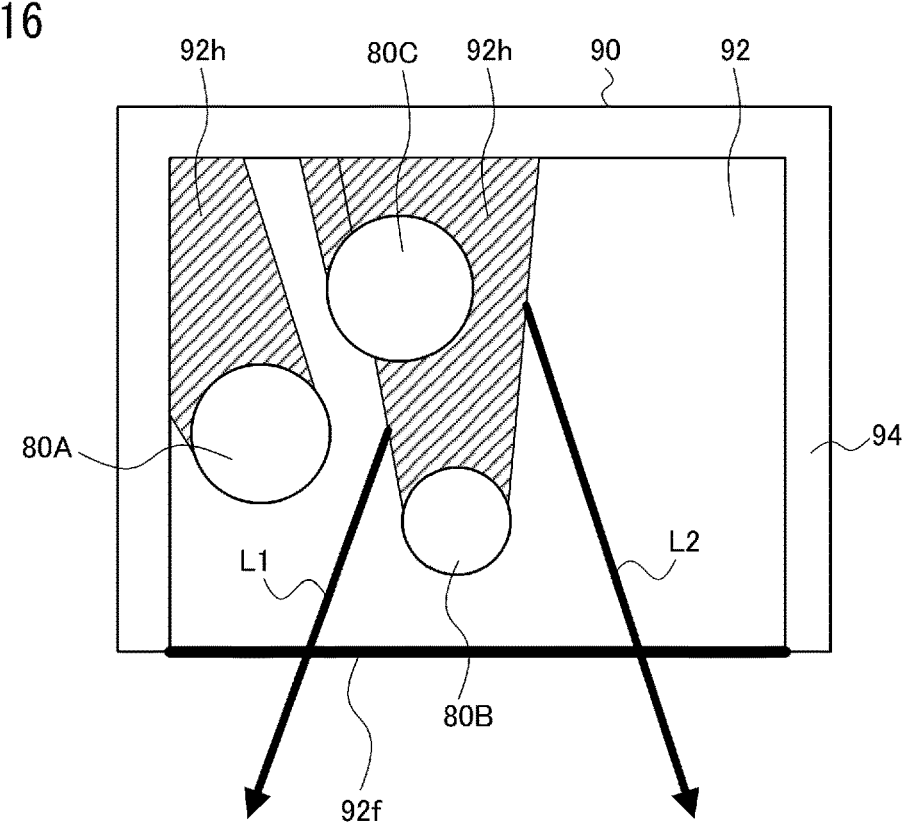
FIG. 16 is a diagram for explaining the process shown in FIG. 15.
Figure 17:
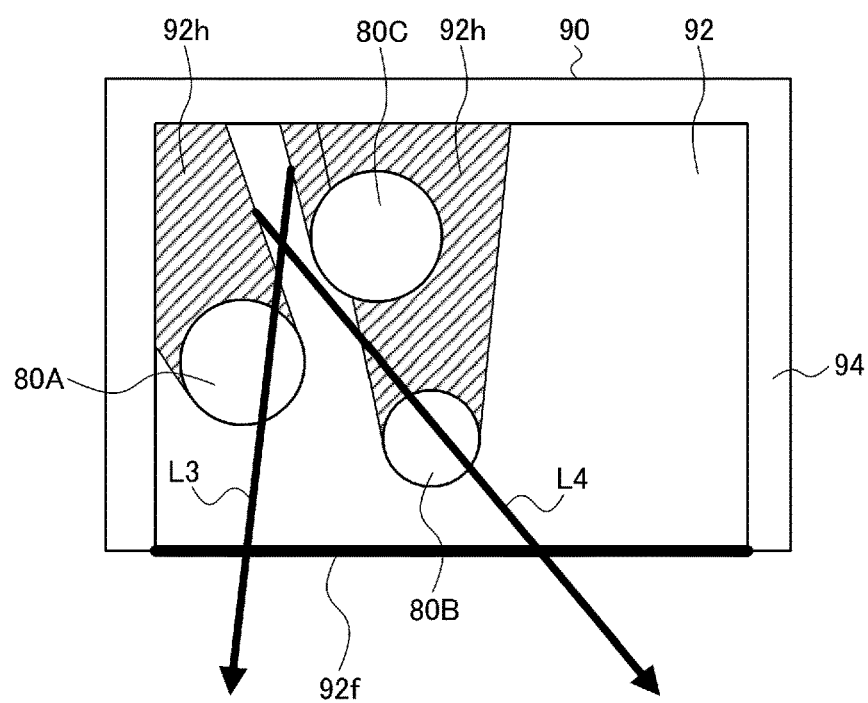
FIG. 17 is a diagram for explaining the process shown in FIG. 15.
Figure 18:
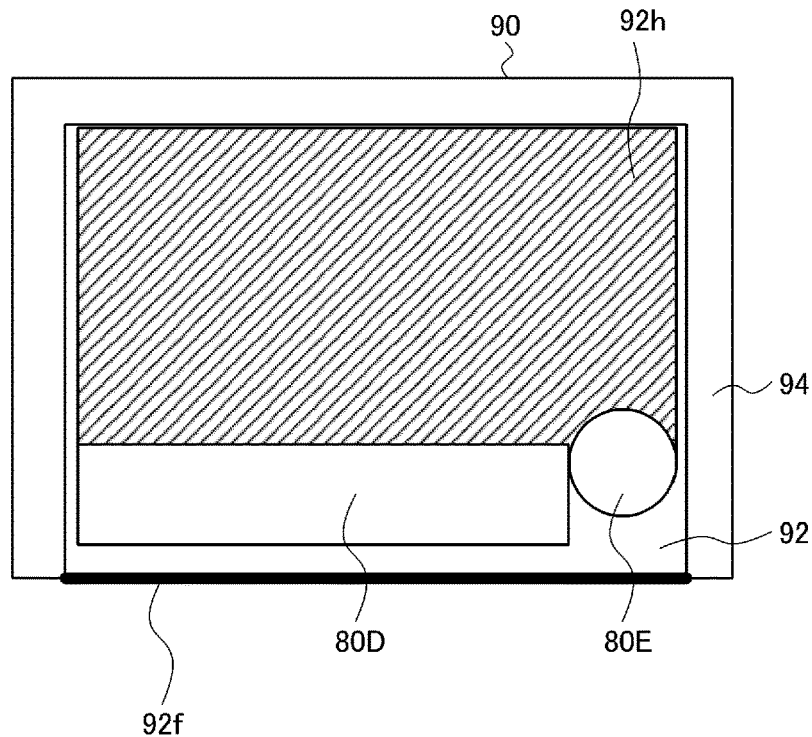
FIG. 18 is a diagram for explaining the process shown in FIG. 15.

FIG. 15 is a flowchart showing an example of a process for determining whether or not there is an unmeasured viewpoint position (S150) according to the first embodiment. Further, FIGS. 16 to 18 are diagrams for explaining the process shown in FIG. 15. Firstly, the optimal viewpoint selection unit 124 extracts a shielded area from the placement available area (step S152). Note that the shielded area is an area in the placement available area (e.g., an area on the upper surface of the shelf board 92) that is neither a measured area nor an area that is inferred to correspond to a bottom surface of an already-recognized target object 80. That is, the shielded area is an area that is obtained by excluding an area(s) that is inferred to correspond to the bottom surface(s) of the already-recognized target object(s) 80 from the area(s) that is shielded by an object(s) (i.e., the target object 80 or the storage object 90) and has not been able to be measured. In FIGS. 16 to 18, shielded areas 92h are indicated by hatching.

Next, the optimal viewpoint selection unit 124 detects a straight line that can extend from a boundary of the shielded area 92h to an edge 92f located on an opened side of the placement available area without being obstructed by any obstacle (step S154). Note that the obstacle is, for example, a target object 80 disposed in the placement available area (the shelf board 92) or the wall surface 94. Both straight lines L1 and L2 shown in FIG. 16 can extend from the boundary of the shielding area 92h to the edge 92f without being obstructed by any obstacle. In contrast, both straight lines L3 and L4 shown in FIG. 17 are obstructed by (interfere with) an obstacle (the target object 80A or the target object 80B) when they extend from the boundary of the shielded area 92h to the edge 92f. Therefore, while the straight lines L1 and L2 are detected, the straight lines L3 and L4 are not detected. Further, in the example shown in FIG. 18, the boundary of the shielded area 92h cannot be connected with the edge 92f by a straight line due to the targets objects 80D and 80E. When an object is disposed with a ratio higher than a predetermined threshold with respect to the horizontal direction (and the vertical direction) of the placement available area as described above, the shielded area 92h cannot be measured.

The optimal viewpoint selection unit 124 determines whether or not a straight line is detected in the process in the step S154 (step S156). When a straight line is detected (Yes at S156), the optimal viewpoint selection unit 124 determines that there is an unmeasured viewpoint position (step S158). On the other hand, when no straight line is detected (No at S156), the optimal viewpoint selection unit 124 determines that there is no unmeasured viewpoint position (step S160). In the example shown in FIG. 16, since a straight line is detected, it is determined that there is an unmeasured viewpoint position. On the other hand, in the example shown in FIG. 18, since no straight line is detected, it is determined that there is no unmeasured viewpoint position.

Note that the examples shown in FIGS. 15 to 17 correspond to the first example of the process in the step S110 shown in FIGS. 5 and 6. That is, in the examples shown in FIGS. 15 to 17, the determination on the unmeasured viewpoint position is made based on whether or not there is an unmeasured area in the shelf board 92. Further, the determination on the unmeasured viewpoint position can also be made by a method corresponding to the second example of the process in the step S110 shown in FIGS. 7 and 8. In this case, the optimal viewpoint selection unit 124 may determine whether or not there is a straight line that can extend from an unmeasured edge 92e of the shelf board 92 (which corresponds to the wall surface 94) to an edge 92f on the opened side of the shelf board 92 without being obstructed by any obstacle.

As described above, the control apparatus 100 according to the first embodiment determines, when detecting a target object 80 by using the sensor 12, a viewpoint position from which the sensor 12 can measure an area that becomes a blind spot due to an obstacle such as another target object 80 as an optimal viewpoint position for the next measurement. Therefore, it is possible to reduce the number of movements of the sensor 12 and the time required therefor when the target object 80 is detected by using the sensor 12. Accordingly, the control apparatus 100 according to the first embodiment can efficiently detect a target object 80 even when the target object 80 is shielded by another object(s).

Second Embodiment

Next, a second embodiment is described. The second embodiment differs from the first embodiment because a target object 80 can be removed in the second embodiment.

Figure 19:
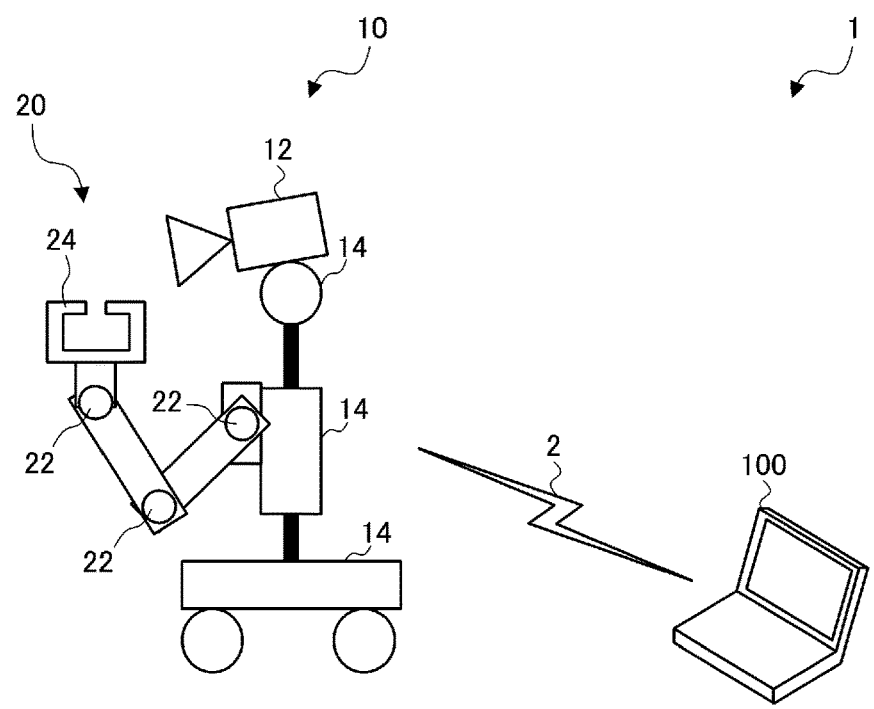
FIG. 19 shows an object detection system according to a second embodiment.
Figure 20:
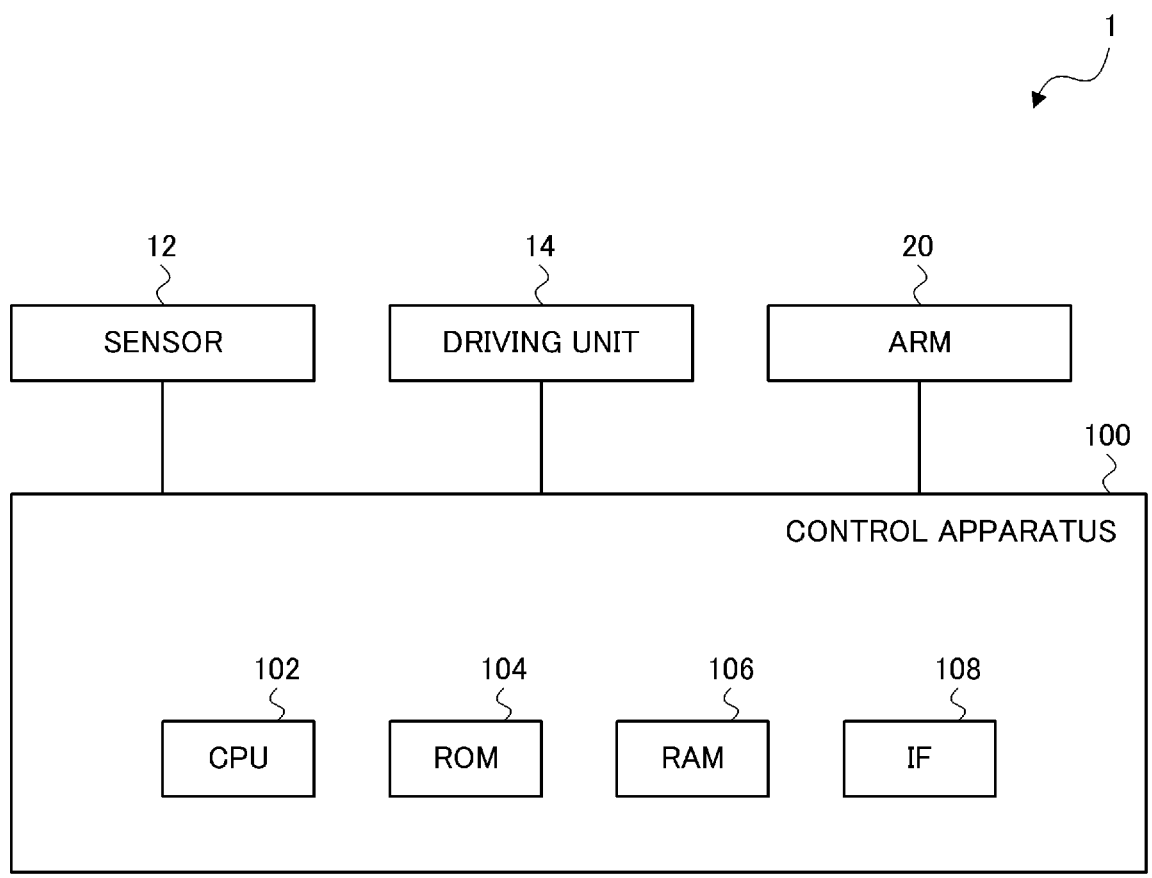
FIG. 20 is a block diagram showing a hardware configuration of the object detection system according to the second embodiment.

FIG. 19 shows an object detection system 1 according to the second embodiment. Further, FIG. 20 is a block diagram showing a hardware configuration of the object detection system 1 according to the second embodiment. The object detection system 1 according to the second embodiment includes an object detection apparatus 10 and a control apparatus 100. The object detection apparatus 10 includes a sensor 12, a driving unit 14 that drives the sensor 12, and an arm 20. The arm 20 is, for example, a robot arm, and includes a plurality of joints 22 and an end effector 24 capable of grasping an object. The arm 20 can grasp a target object 80 under the control of the control apparatus 100.

Figure 21:
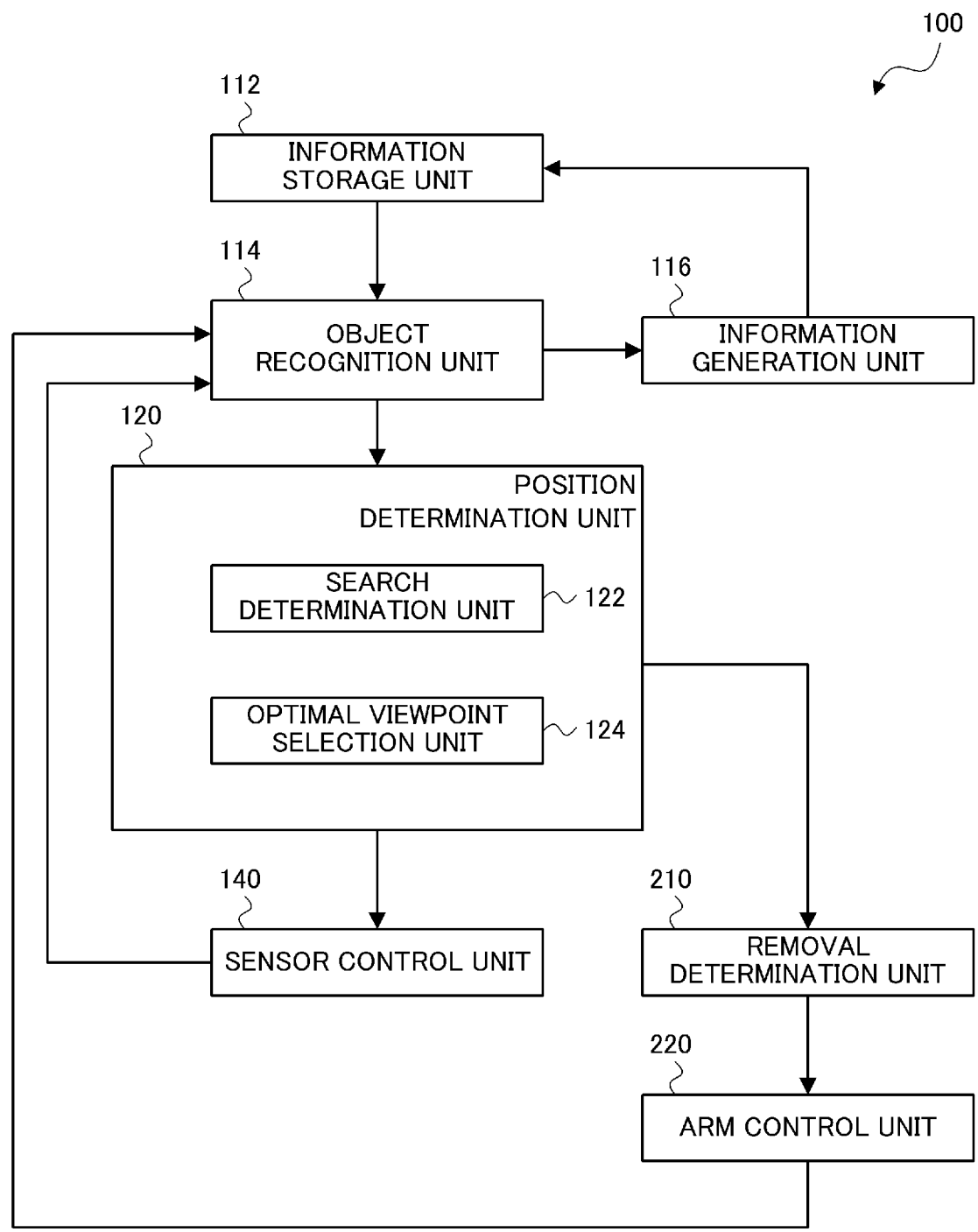
FIG. 21 is a functional block diagram showing a configuration of a control apparatus according to the second embodiment.

FIG. 21 is a functional block diagram showing a configuration of the control apparatus 100 according to the second embodiment. The control apparatus 100 according to the second embodiment includes an information storage unit 112, an object recognition unit 114, an information generation unit 116, a position determination unit 120, and a sensor control unit 140. Further, the control apparatus 100 according to the second embodiment includes a removal determination unit 210 and an arm control unit 220.

Figure 22:
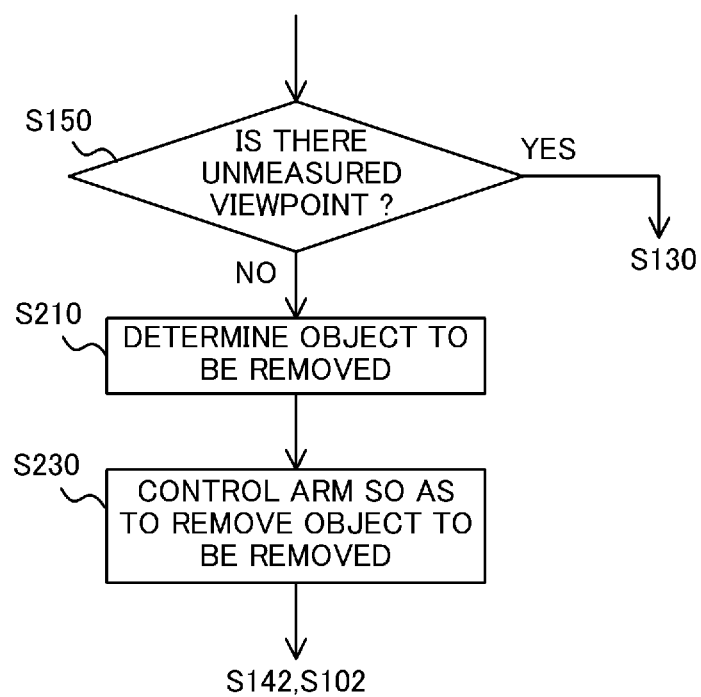
FIG. 22 is a flowchart showing an object detection method performed by the control apparatus according to the second embodiment.

FIG. 22 is a flowchart showing an object detection method performed by the control apparatus 100 according to the second embodiment. Note that in FIG. 22, illustrations of processes substantially similar to those in FIG. 4 are omitted. When there is no unmeasured viewpoint (No at S150), the removal determination unit 210 determines which target object 80 needs to be removed in order to measure an unmeasured area (a shielded area) in the best way (step S210). Specifically, the removal determination unit 210 determines one of already-recognized target objects 80 which provides a largest measurable area when removed (i.e., an object to be removed). A specific determination method will be described later. As described above, the control apparatus 100 according to the second embodiment can determine an object to be removed (hereinafter also referred to as a removal object). As a result, it is possible to measure an unmeasured area by removing the removal object in the subsequent processes, so that the control apparatus 100 according to the second embodiment can make it possible to efficiently measure the unmeasured area.

Then, the arm control unit 220 controls the arm 20 so as to take out (i.e., remove) the removal object determined in the step S210 and moves it to a location other than the storage object 90 (step S230). Specifically, the arm control unit 220 detects a position of the removal object (the target object 80) by using the 3D environmental information. The arm control unit 220 extracts positions of the storage object 90 and other target objects 80, and detects (i.e., determines) a trajectory of the arm 20 that does not interfere (i.e., collide) with the storage object 90 and the other target objects 80. Then, the arm control unit 220 controls the joints 22 so that the arm 20 moves along the detected trajectory. Then, when the end effector 24 reaches a position where it can grasp the removal object, the arm control unit 220 controls the end effector 24 so as to grasp the removal object. Then, the arm control unit 220 controls the arm 20 so as to move the removal object to other places. Note that when a target object 80 that has been searched for is found as a result of the removal of the removal object, the arm control unit 220 may control the arm 20 so as to grasp and remove that target object 80. As described above, a removal object can be automatically removed in the second embodiment. Therefore, it is possible to efficiently measure an unmeasured area.

Figure 23:
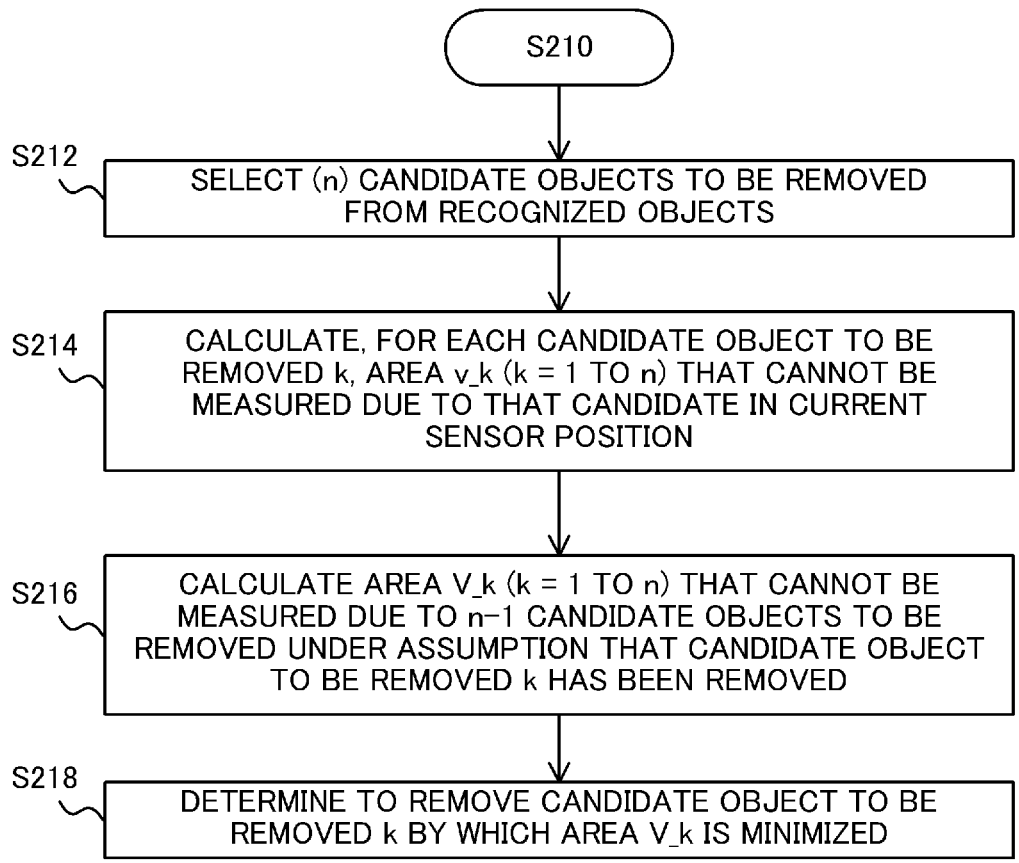
FIG. 23 is a flowchart showing an example of a method for determining an object to be removed according to the second embodiment.
Figure 24:
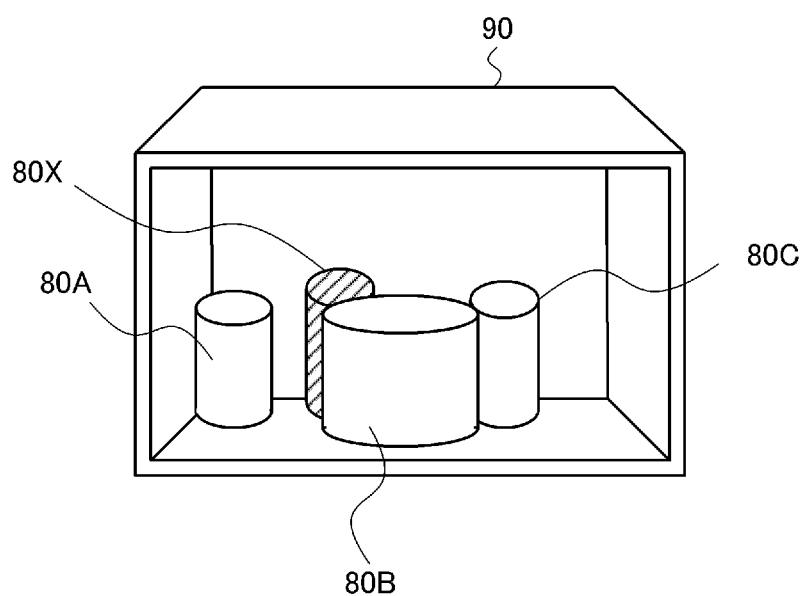
FIG. 24 is a diagram for explaining the method shown in FIG. 23.

FIG. 23 is a flowchart showing an example of a method for determining a removal object according to the second embodiment. Further, FIGS. 24 to 28 are diagrams for explaining the method shown in FIG. 23. Firstly, the removal determination unit 210 selects a candidate (a candidate removal object) that can be removed by using the arm 20 from among recognized target objects 80 (step S212). Specifically, the removal determination unit 210 makes, for each of already-recognized target objects 80, a trajectory plan for the arm 20 by which that target object 80 can be grasped, and selects a candidate removal object that can be grasped and removed. Here, the number of selected candidate removal objects is represented by n. In the example shown in FIG. 24, it is assumed that target objects 80A, 80B and 80C are candidate removal objects. That is, the number n is three (n=3). Further, it is assumed that a target object 80X has not been recognized yet.

Figure 25:
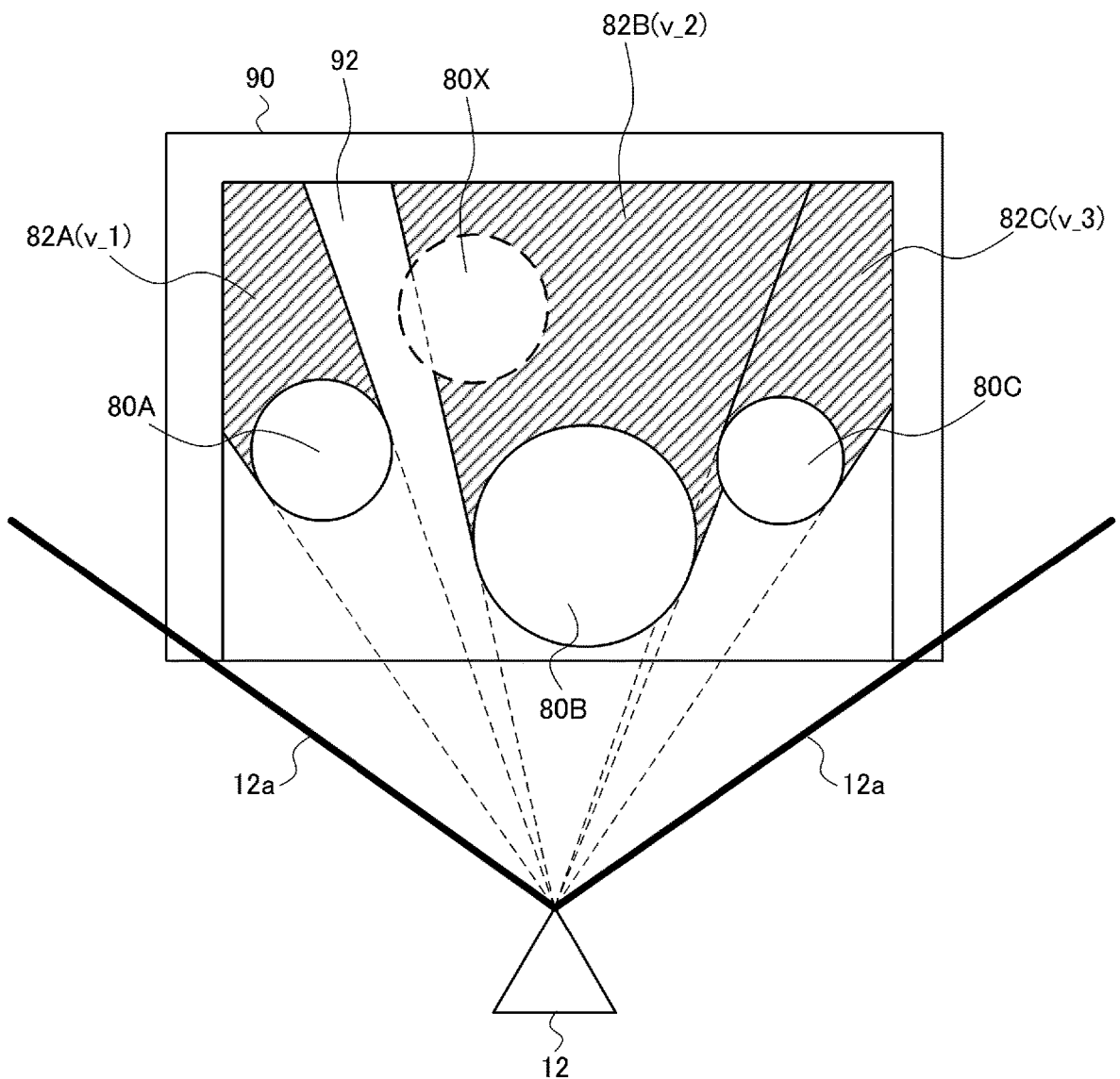
FIG. 25 is a diagram for explaining the method shown in FIG. 23.

Next, the removal determining unit 210 calculates, for each candidate removal object k, an area v_k that cannot be measured due to that candidate removal object k (i.e., an unmeasurable area v_k) (k is an integer between 1 to n) in the current sensor position (step S214). Referring to FIG. 25, the removal determination unit 210 calculates an unmeasurable area 82A (v_1) that becomes a blind spot due to the target object 80A (k=1), which is one of the candidate removal objects. Similarly, the removal determination unit 210 calculates unmeasurable areas 82B (v_2) and 82C (v_3) that become blind spots due to the target objects 80B (k=2) and 80C (k=3), respectively, which are candidate removal objects. Note that parts of the unmeasurable areas 82B and 82C overlap each other.

Figure 26:
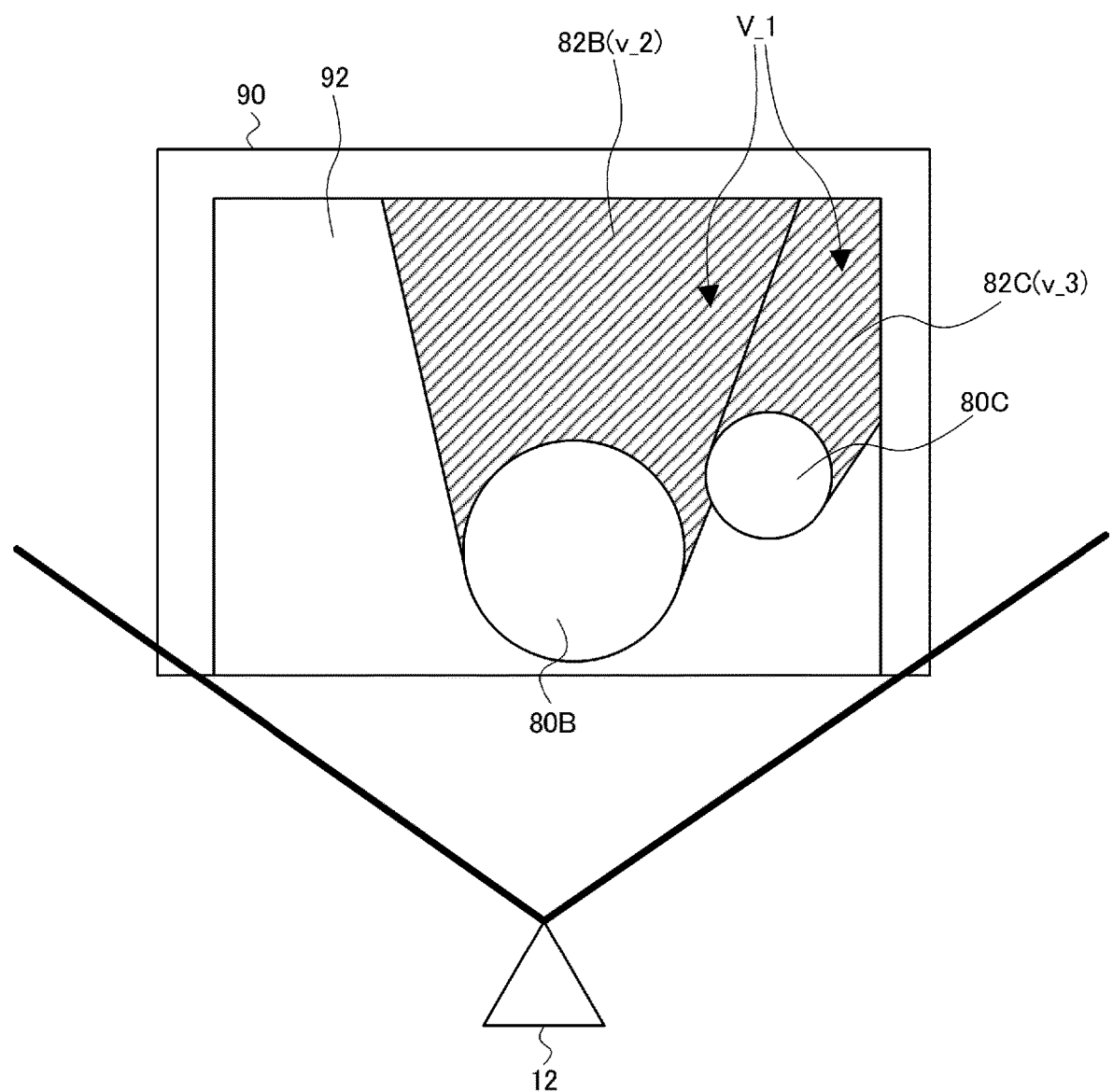
FIG. 26 is a diagram for explaining the method shown in FIG. 23.

Next, the removal determining unit 210 calculates an area V_K that cannot be measured due to n−1 candidate removal objects (i.e., an unmeasurable area V_K) under an assumption that the candidate removal object k has been removed (Step S216). FIG. 26 shows unmeasurable areas 82B and 82C, which become blind spots due to the target objects 80B and 80C under an assumption that the target object 80A has been removed. An area where at least one of the unmeasurable areas 82B and 82C is present is an unmeasurable area V_1 under the assumption that the target object 80A (k=1) has been removed. That is, the unmeasurable area V_1 corresponds to a union of the unmeasurable areas 82B (v_2) and 82C (v_3).

Figure 27:
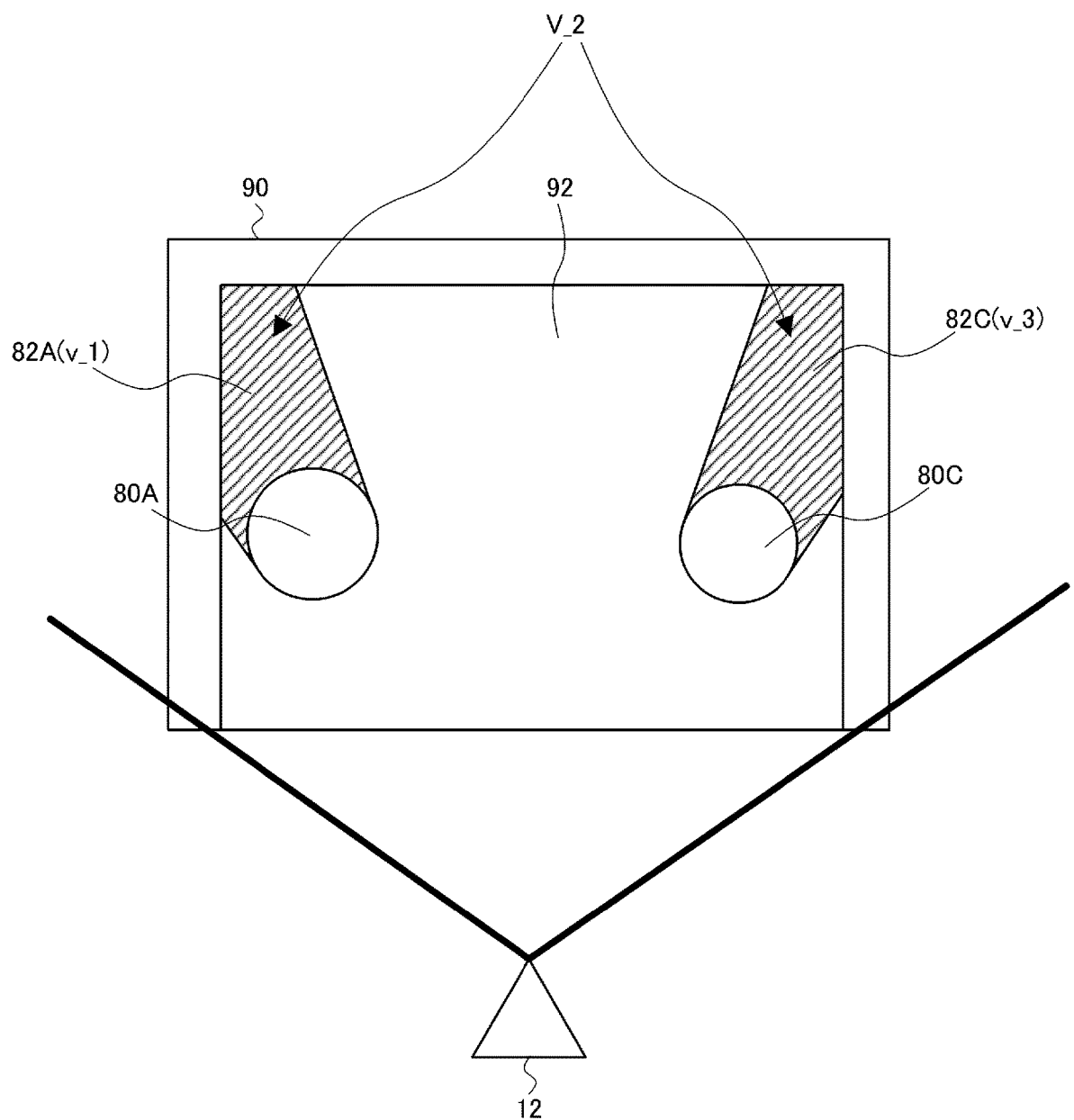
FIG. 27 is a diagram for explaining the method shown in FIG. 23.

FIG. 27 shows unmeasurable areas 82A and 82C, which become blind spots due to the target objects 80A and 80C under an assumption that the target object 80B has been removed. An area where at least one of the unmeasurable areas 82A and 82C is present is an unmeasurable area V_2 under the assumption that the target object 80B (k=2) has been removed. That is, the unmeasurable area V_2 corresponds to a union of the unmeasurable areas 82A (v_1) and 82C (v_3).

Figure 28:
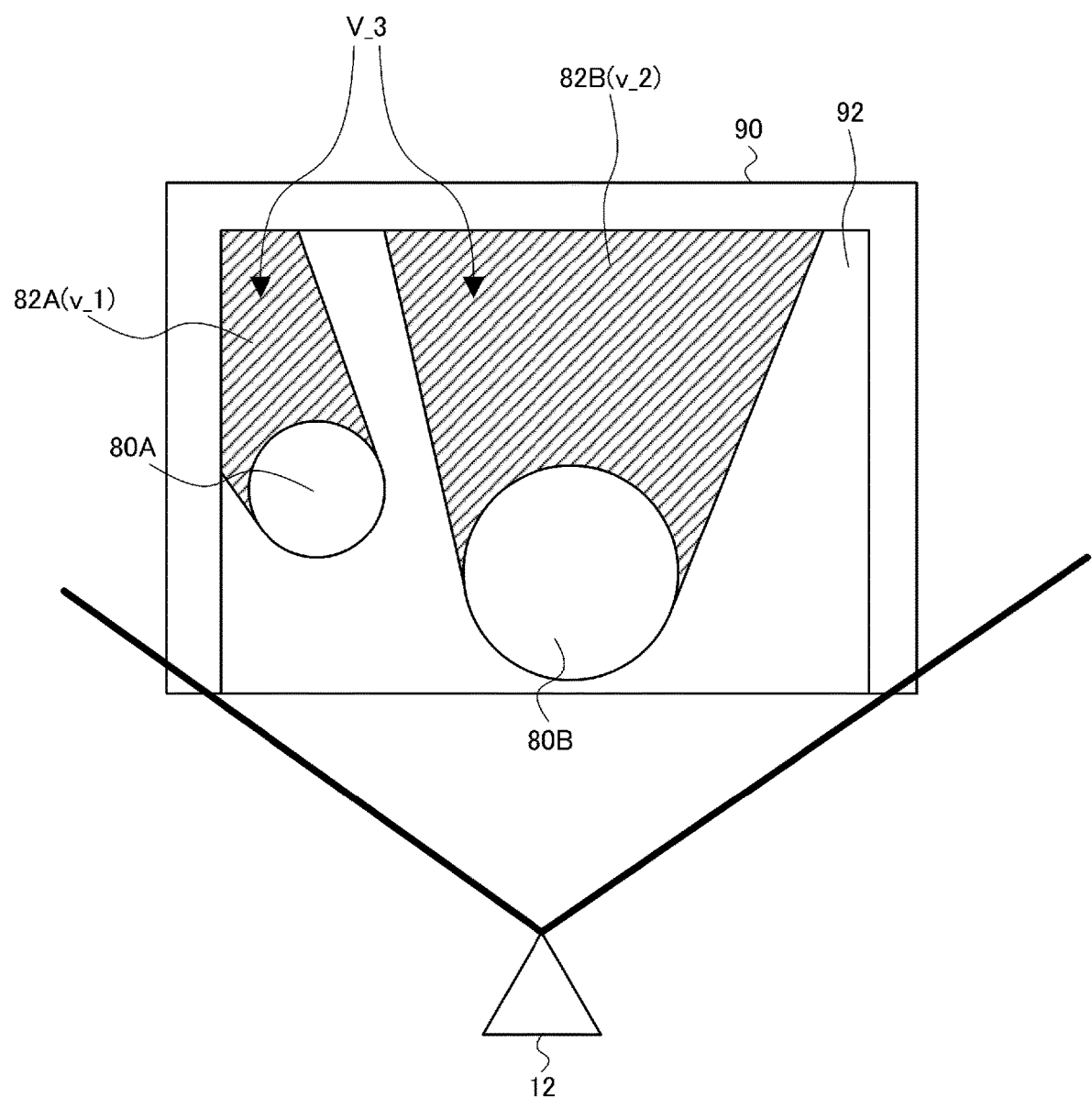
FIG. 28 is a diagram for explaining the method shown in FIG. 23.

FIG. 28 shows unmeasurable areas 82A and 82B, which become blind spots due to the target objects 80A and 80B under an assumption that the target object 80C has been removed. An area where at least one of the unmeasurable areas 82A and 82B is present is an unmeasurable area V_3 under the assumption that the target object 80C (k=3) has been removed. That is, the unmeasurable area V_3 corresponds to a union of the unmeasurable areas 82A (v_1) and 82B (v_2).

Then, the removal determining unit 210 determines, as the removal object, a candidate removal object k that can reduce the unmeasurable area V_k the most when removed (step S218). That is, the removal determination unit 210 determines, as the target object 80 that provides the largest measurable area when removed, a candidate removal object that had been assumed to be removed when the unmeasurable area V_k was reduced the most. In the examples shown in FIGS. 24 to 28, the unmeasurable area V_2 shown in FIG. 27 is the smallest among the unmeasurable areas V_1 to V_3. Therefore, the removal determining unit 210 determines that the target object 80B should be removed.

Modified Example

Note that the present disclosure is not limited to the above-described embodiments and they can be modified as desired without departing from the scope and spirit of the disclosure. For example, the order of steps in the flowchart shown in FIG. 4, etc. can be changed as desired. Further, one or more steps in the flowchart shown in FIG. 4, etc. may be omitted. Further, although the optimal viewpoint position indicates 3D coordinates and an orientation (an angle) in the 3D environment 4 in the above-described embodiments, the present disclosure is not limited to such configurations. The optimal viewpoint position may indicate 3D coordinates in the 3D environment.

Further, although the target object 80 is placed on the shelf board 92 in the above-described embodiments, the present disclosure is not limited to such configurations. For example, the target object 80 may be hooked on a hook provided (e.g., attached) on the wall surface 94. Further, the target object 80 does not need to be disposed (stored) in the storage object 90. The target object 80 may be placed on the floor surface in the 3D environment 4.

Further, although the sensor 12 is a range sensor (a 3D sensor) in the above-described embodiments, the present disclosure is not limited to such configurations. The sensor 12 may be a two-dimensional (2D) sensor, provided that it can generate 3D environmental information. However, by using a range sensor, it is possible to easily recognize a 3D position of an object without performing complex image processing (such as edge detection and pattern matching).

Further, although a target object 80 that is determined to be a removal object is removed by the arm 20 in the above-described second embodiment, the present disclosure is not limited to such configurations. The control apparatus 100 may output information as to which target object 80 is the removal object to, for example, the interface unit 108. Then, a user may manually remove the target object 80 whose information was output to the interface unit 108.

Further, in the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control apparatus configured to detect a target object to be detected by controlling a sensor configured to measure surroundings in a three-dimensional (3D) environment, the control apparatus comprising:
   hardware including at least one memory configured to store a computer program and at least one processor configured to execute the computer program;
   an object recognition unit, implemented by the hardware, configured to recognize the target object present in the 3D environment by using measurement data acquired from the sensor;
   an information generation unit, implemented by the hardware, configured to generate 3D environmental information indicating each point on an object present in the 3D environment by integrating a plurality of measurement data;
   a position determination unit, implemented by the hardware, configured to determine an optimal position of the sensor for performing a next measurement; and
   a sensor control unit, implemented by the hardware, configured to move the sensor to the determined optimal position, wherein
   the position determination unit calculates, as a candidate for the optimal position, a position of the sensor where the sensor can measure a placement available area according to a position and a shape of a storage object in which the target object can be placed, the placement available area being an area where the target object can be placed, and
   the position determination unit determines, by using the 3D environmental information, from the candidate, a position of the sensor where the sensor can take an image in which a size of an area shielded by at least one first object is larger, as the optimal position for performing the next measurement, the at least one first object being the target object recognized by the object recognition unit, and at least one second object which is the target object that has not been recognized by the object recognition unit exists at the shielded area.

2. The control apparatus according to claim 1, wherein the position determination unit determines whether or not, among candidate positions, there is an unmeasured position from which the sensor can measure the area shielded by the at least one first object but has not performed measurement yet, and when it is determined that there is the unmeasured position, performs a process for determining the optimal position.

3. The control apparatus according to claim 2, further comprising a removal determination unit configured to, when it is determined that there is no unmeasured position, determine the at least one first object to be removed so that the area shielded by the at least one first object can be measured.

4. The control apparatus according to claim 3, further comprising an arm control unit configured to control an arm so that the determined at least one first object is removed.

5. The control apparatus according to claim 1, wherein the position determination unit determines whether or not a search of the placement available area, which is the area where the target object can be placed, has been completed by using the 3D environmental information, and when it is determined that the search has not been completed, performs a process for determining the optimal position.

6. An object detection system comprising:
   a sensor configured to measure surroundings in a 3D environment; and
   a control apparatus configured to detect a target object to be detected by controlling the sensor,
   wherein the control apparatus comprises:
   hardware, including at least one memory configured to store a computer program and at least one processor configured to execute the computer program;
   an object recognition unit, implemented by the hardware, configured to recognize the target object present in the 3D environment by using measurement data acquired from the sensor;
   an information generation unit, implemented by the hardware, configured to generate 3D environmental information indicating each point on an object present in the 3D environment by integrating a plurality of measurement data;
   a position determination unit, implemented by the hardware, configured to determine an optimal position of the sensor for performing next measurement; and
   a sensor control unit, implemented by the hardware, configured to move the sensor to the determined optimal position, and
   wherein the position determination unit calculates, as a candidate for the optimal position, a position of the sensor where the sensor can measure a placement available area according to a position and a shape of a storage object in which the target object can be placed, the placement available area being an area where the target object can be placed, and the position determination unit determines, by using the 3D environmental information, from the candidate, a position of the sensor where the sensor can take an image in which a size of an area shielded by at least one first object is larger, as the optimal position for performing the next measurement, the at least one first object being the target object recognized by the object recognition unit, and at least one second object which is the target object that has not been recognized by the object recognition unit exists at the shielded area.

7. An object detection method for detecting a target object to be detected by controlling a sensor configured to measure surroundings in a 3D environment, comprising:
   recognizing the target object present in the 3D environment by using measurement data acquired from the sensor;
   generating 3D environmental information indicating each point on an object present in the 3D environment by integrating a plurality of measurement data;
   calculating, as a candidate for an optimal position of the sensor for performing next measurement, a position of the sensor where the sensor can measure a placement available area according to a position and a shape of a storage object in which the target object can be placed, the placement available area being an area where the target object can be placed;
   determining, by using the 3D environmental information, from the candidate, a position of the sensor where the sensor can take an image in which a size of an area shielded by at least one first object is larger, as the optimal position for performing the next measurement, the at least one first object being the recognized target object, and at least one second object which is the target object that has not been recognized exits at the shielded area; and
   moving the sensor to the determined optimal position.

8. A non-transitory computer readable medium storing a program for performing an object detection method in which a target object to be detected is detected by controlling a sensor configured to measure surroundings in a 3D environment, the program a computer to perform a method comprising:
   recognizing the target object present in the 3D environment by using measurement data acquired from the sensor;
   generating 3D environmental information indicating each point on an object present in the 3D environment by integrating a plurality of measurement data;
   calculating, as a candidate for an optimal position of the sensor for performing next measurement, a position of the sensor where the sensor can measure a placement available area according to a position and a shape of a storage object in which the target object can be placed, the placement available area being an area where the target object can be placed;
   determining, by using the 3D environmental information, from the candidate, a position of the sensor where the sensor can take an image in which a size of an area shielded by at least one first object is larger, as the optimal position for performing the next measurement, the at least one first object being the recognized target object, and at least one second object which is the target object that has not been recognized by the object recognition unit exits at the shielded area; and
   moving the sensor to the determined optimal position.

* * * * *